United States Patent [19]
Lautzenheiser et al.

[11] Patent Number: 6,023,572
[45] Date of Patent: Feb. 8, 2000

[54] COMPUTER BASED SYSTEM AND METHOD FOR MODELING ACTIVITIES OF PEOPLE IN AN ORGANIZATION

[75] Inventors: Ted G. Lautzenheiser, Forest Lake; David R. Lacy, Cottage Grove, both of Minn.

[73] Assignee: Unisys Corporation, Blue Bell, Pa.

[21] Appl. No.: 09/076,190

[22] Filed: May 12, 1998

[51] Int. Cl.$^7$ .................................................. G06F 17/60
[52] U.S. Cl. ............................ 395/500.23; 705/7; 705/8; 705/9
[58] Field of Search ......................... 395/500.32; 705/7, 705/8, 9, 11; 364/468.05, 468.06

[56] References Cited

U.S. PATENT DOCUMENTS

| | | | |
|---|---|---|---|
| 5,255,181 | 10/1993 | Chapman et al. | 705/8 |
| 5,493,489 | 2/1996 | Tamaki et al. | 705/8 |
| 5,630,069 | 5/1997 | Flores et al. | 705/7 |
| 5,836,011 | 11/1998 | Hambrick et al. | 705/8 |
| 5,938,388 | 8/1999 | Davis et al. | 705/8 |

OTHER PUBLICATIONS

Bussler, C.; Jablonski, S.;"An Approach to Integrate Workflow Modeling and Organization Modeling in an Enterprise", Proceedings of the Third Workshop on Enabling Technologies: Infrastructure for Collaborative Enterprises, pp. 81–95, Apr. 1994.

Landry, J.R.;"An Organizational Exchange Model: Theory and Implementation", Proceedings of the Twenty–Ninth Hawaii International Conference on System Sciences, vol. 4, pp. 41–47, Jan. 1996.

*Primary Examiner*—Kevin J. Teska
*Assistant Examiner*—Douglas W. Sergent
*Attorney, Agent, or Firm*—Charles A. Johnson; Mark T. Starr; Crawford, PLLC

[57] ABSTRACT

A system and method for modeling activities of people in an organization. The organization is modeled using definitions of processes performed by the organization, definitions of data elements generated by the entities performing the processes, and definitions of relationships between the data elements generated and the processes. Each relationship definition symbolizes a data element provided by a first one of the processes and required by a second one of the processes. In an example embodiment, the database is accessible to a server system, and a client system is coupled to the server system. Responsive to an input control signal at the client system, a request is sent to the server system for organization modeling data. The client system displays the organization modeling data, wherein processes are depicted as nodes on a graph and the data elements are depicted as directed edges connecting nodes. The system also models events that cause transitions between the processes.

27 Claims, 20 Drawing Sheets

Business Planning Scenario #1A: Annual Planning Scenario

COMPUTER BASED SYSTEM AND METHOD FOR MODELING ACTIVITIES OF PEOPLE IN AN ORGANIZATION

FIELD OF THE INVENTION

The present invention generally relates to computer based modeling arrangements, and more particularly to modeling the processes, procedures and information exchanged and provided by people in an organization.

BACKGROUND

People generally establish organizations in order to achieve a desired objective. Organizations are sometimes flat, sometimes hierarchical, and sometimes complex. Governments, charities, and businesses are typical examples of entities that have organizations. Apart from a stated objective of an organization, a more fundamental purpose of an organization is to achieve the stated objective in an orderly and efficient manner. However, as organizations grow, order and efficiency are sometimes sacrificed.

Large organizations, namely, those with many groups of people, often have well-established procedures covering all phases of achieving the objective of the organization. An example objective is engineering a product. The need for procedures is driven by the need to ensure that the objective is achieved. However, larger scale objectives typically require larger numbers of people which results in more complex organizations. Compare the scale of an organization assembled to engineer a stapler with the scale of an organization assembled to engineer a jumbo jetliner.

A problem with large organizations is that they sometimes become so large and complex that they are difficult to understand. For personnel that have not experienced all facets of an organization, understanding the organization can be even more difficult. In another area, various organizations are audited, not only from a financial perspective, but from a procedure perspective. For example, the government audits various government contractors to ensure compliance with various contract requirements, and various standards inspectors audit for compliance with particular standards, such as ISO 9000 requirements. For large organizations it may be difficult to easily identify who is responsible for compliance with a certain aspect of an audit.

A problem with large and sometimes small organizations is the difficulty to be able to quickly understand how the organization operates as a whole and the interrelationship between the groups and the established procedures within the organization. Often, there are many people organized in various groups. Each group is likely to have multiple work objectives, each person within the group is likely to have multiple responsibilities, and the group is likely to be dependent upon information and/or work products from other group in order to meets its commitments. Complicating matters is the fact that there are typically many groups which compounds the difficulty of identifying problems and affecting meaningful change in the organization. Therefore, a system and method that addresses the above identified problems is needed.

SUMMARY

Generally, a system and method are provided that models the relationship between the processes and information exchange of an organization. In the various embodiments, the system models processes performed by the organization, information exchanged by the processes, and events that cause the initiation of the processes. The system is useful for small organizations as well as for large complex organizations. The computer based modeling of the organization allows persons new to the organization to easily see how their responsibilities relate to the organization, thereby assisting in training. In addition, auditing organizations can see how an organization functions and verify the compliance with various requirements. Persons within the organization can use the system to streamline processes and identify duplication of work.

A computer implemented method for modeling activities of people in an organization is provided in a first example embodiment. The method comprises establishing definitions of processes performed by the organization; establishing definitions of data elements generated by the entities performing the processes; establishing definitions of relationships between the data elements generated and the processes, wherein each relationship definition symbolizes a data element provided by a first one of the processes and required by a second one of the processes; and displaying processes as nodes on a graph and the data elements as directed edges connecting nodes.

In another embodiment, an apparatus for modeling activities of people in an organization is provided. The apparatus comprises means for establishing definitions of processes performed by the organization; means for establishing definitions of data elements generated by the entities performing the processes; means for establishing definitions of relationships between the data elements generated and the processes, wherein each relationship definition symbolizes a data element provided by a first one of the processes and required by a second one of the processes; and means for displaying processes as nodes on a graph and the data elements as directed edges connecting nodes.

A system is provided for modeling activities of people in an organization in another embodiment. The system comprises a server system; a database system coupled to the server system and including definitions of processes performed by the organization, definitions of data elements generated by the entities performing the processes, and definitions of relationships between the data elements generated and the processes, wherein each relationship definition symbolizes a data element provided by a first one of the processes and required by a second one of the processes; a client system coupled to the server system and configured and arranged, responsive to an input control signal, to request from the server system referenced data and display processes as nodes on a graph and the data elements as directed edges connecting nodes.

BRIEF DESCRIPTION OF THE DRAWINGS

The invention may be more completely understood in consideration of the following detailed description of various embodiments of the invention in connection with the accompanying drawings, in which.

Figure 1:
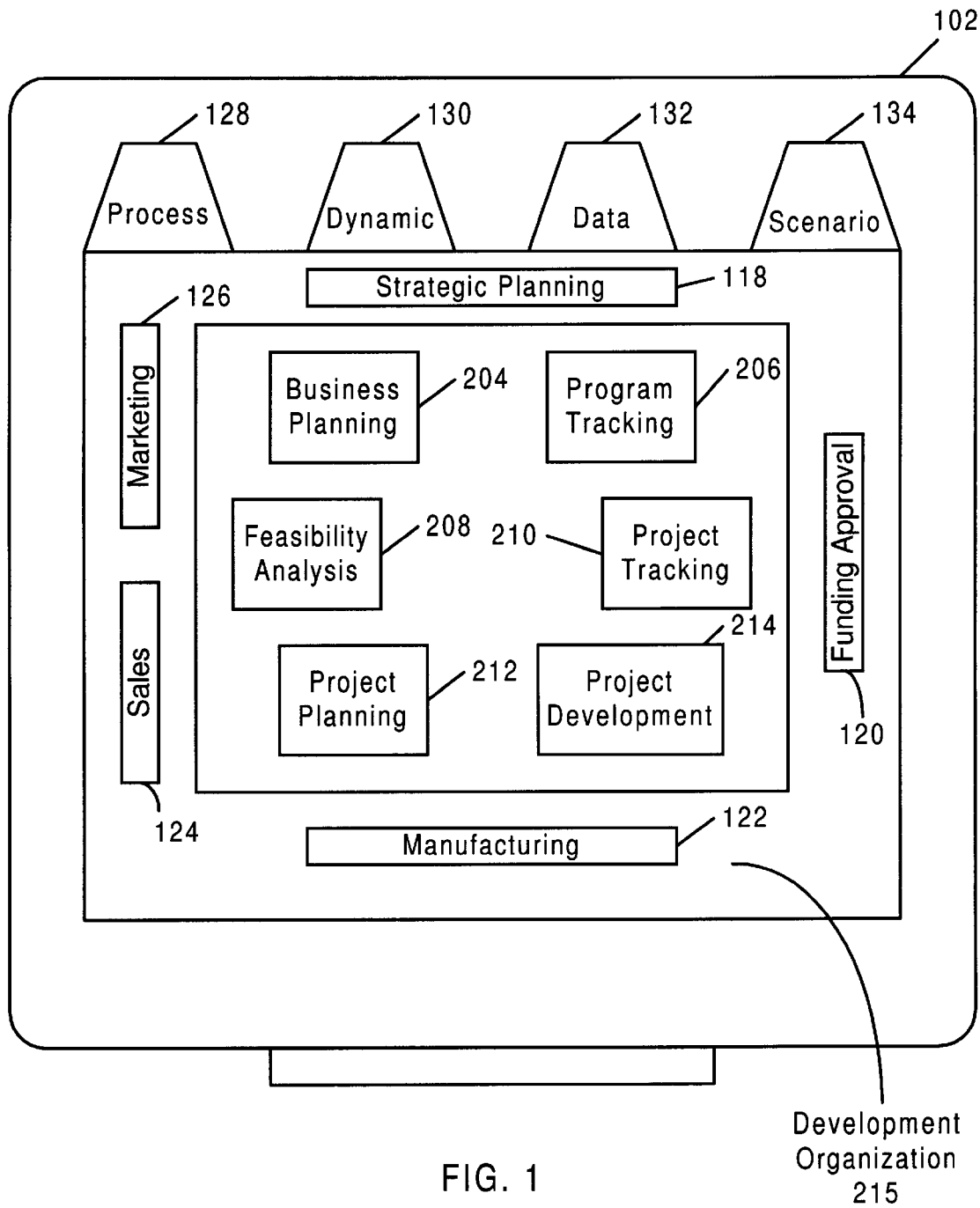
FIG. 1 illustrates a computer monitor on which are displayed various processes performed by a development organization according to an example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The invention is generally directed to modeling the processes and information exchanged in an organization. The invention also models events that affect the processes of an organization in another embodiment. The invention has been found to be particularly applicable to an engineering organization. While the present invention is not so limited, an appreciation of various aspects of the invention is best gained through a discussion of an example model of such an organization.

FIG. 1 illustrates a computer monitor on which are displayed various processes performed by a development organization according to an example embodiment of the invention. While the processes depicted are those typically associated with a development organization, it will be appreciated that the invention could be applied to any organization having well defined processes and identifiable work products generated by the processes. Therefore, the invention is not limited to modeling development organizations.

The monitor 102 of FIG. 1 has displayed thereon various related processes that are performed by and impact an example development organization. Using the data presented, a user can identify the major activities performed by the development organization and also identify the major activities of other organizations that may impact the development organization. For example, the organization includes processes for business planning, program tracking, feasibility analysis, project tracking, project planning, and project development, as depicted by blocks 204, 206, 208, 210, 212, and 214, respectively. For convenience, the blocks that depict the processes will hereinafter be referenced as the process itself, for example, project planning process 212.

The block 215 that contains the business planning, program tracking, feasibility analysis, project tracking, project planning, and project development processes 204–214 symbolizes that these processes are performed by the particular development organization. Other organizations whose activities may influence the development organization are depicted as blocks 118, 120, 122, 124, and 126. Such "external" organizations include strategic planning, funding approval, manufacturing, sales, and marketing. While not shown, it will be appreciated that the other organizations could have models that could be depicted similarly. For example, the manufacturing organization 122 would have its own particular set of processes, wherein the development organization would be depicted as a block (not shown) that is external to the manufacturing organization.

The screen of FIG. 1 also includes process, dynamic, data, and scenario tabs 128, 130, 132, and 134 respectively. Each of the tabs is used to select a particular format or "view" for illustrating the interrelationship between the processes 204–214 that comprise the development organization. In an example embodiment, the tabs can be selected via a computer based pointing device, such as a mouse, touch screen, track-ball, along with the conventional software associated therewith. The process view can be thought of as a data flow diagram, where data is shown flowing between the processes. The dynamic view shows processes and events, the occurrence of which results in the transition from one process to another. The data view depicts that data elements that are generated and referenced by the various processes. The scenario view shows a collection of various paths, where a path in the context of the example development organization shows a possible collection of events and processes through which a project can be developed.

Figure 2:
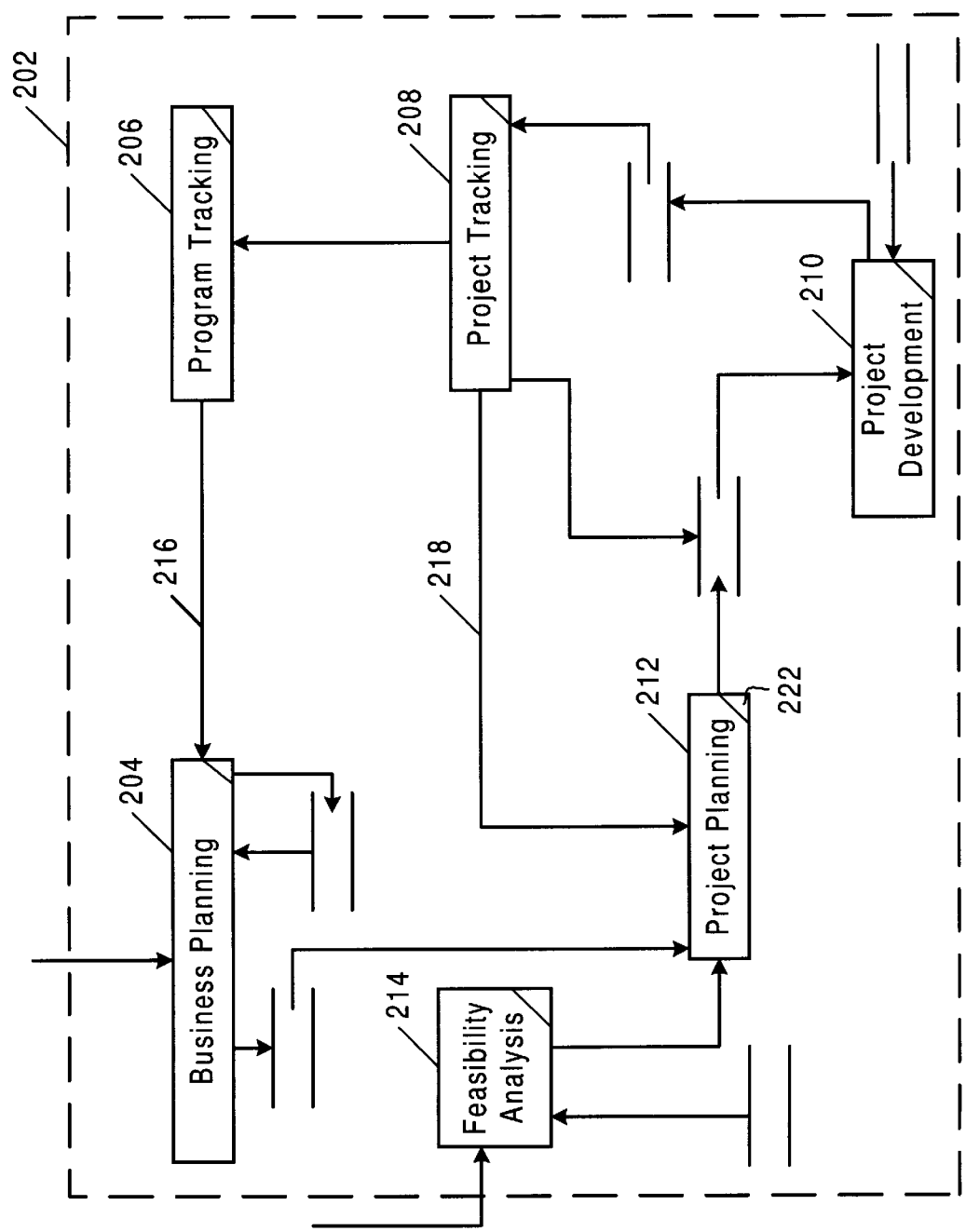
FIG. 2 illustrates a process view of an example development organization according to an example embodiment of the invention, and depicts that which is displayed on a computer monitor.
Figure 3:
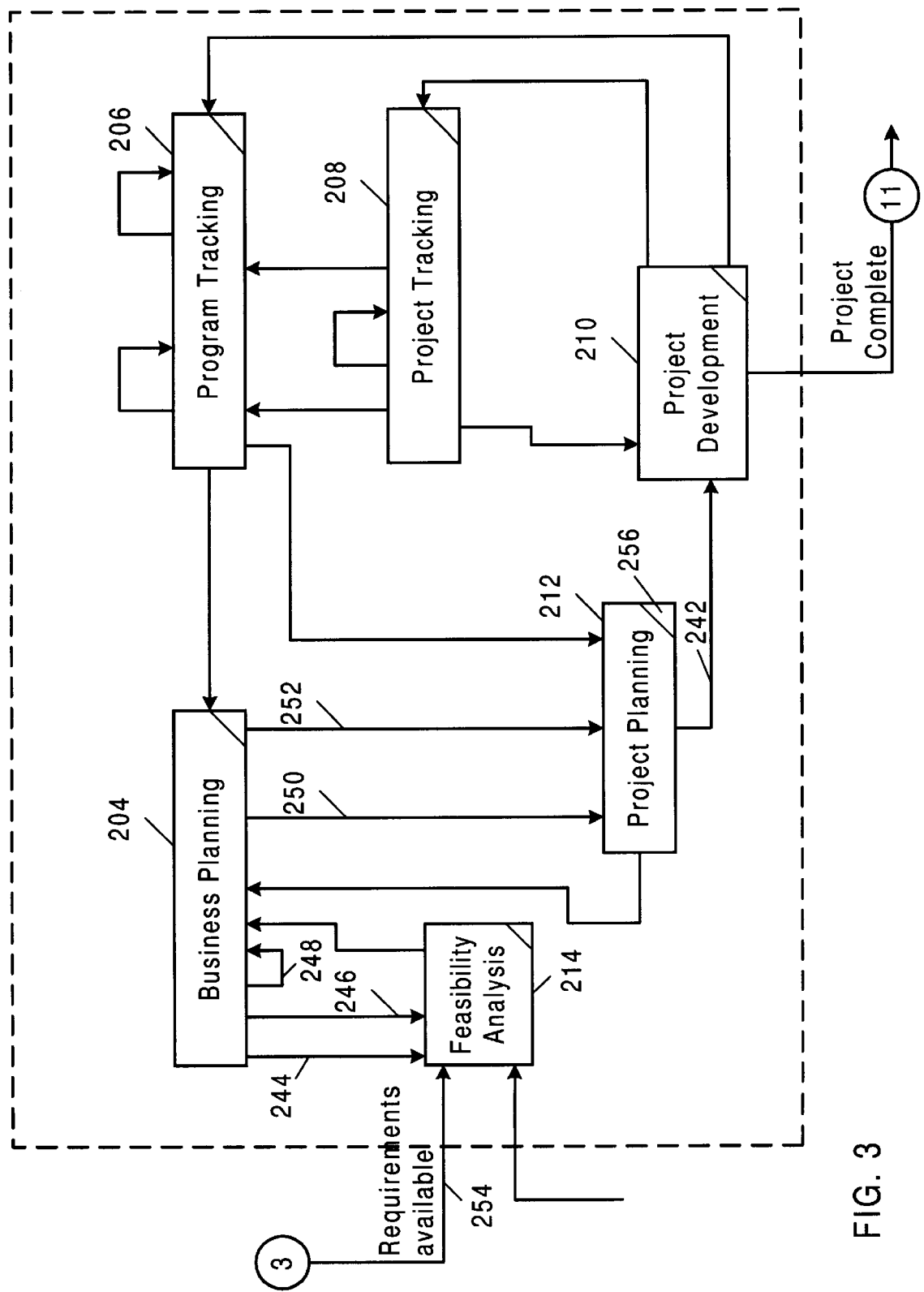
FIG. 3 illustrates a dynamic view of the processes of an example organization.

Example process and dynamic views of the development organization are shown in FIGS. 2 and 3 which follow, while the example data, dynamic, and scenario views of FIGS. 4, 5, 6, and 7 are those associated with the project planning process 212 that is part of the development organization.

FIG. 2 illustrates a process view of an example development organization according to an example embodiment of the invention, and depicts that which is displayed on a computer monitor. The process view can be thought of as a data flow diagram, where data is shown flowing between the processes, which is helpful in understanding the primary processes of an organization and the nature of the data that is exchanged by the processes. The process view may assist in identifying inefficiencies in obtaining data, for example, where there is duplication of data entry or data is entered manually where its entry could be automated.

The dashed block delineates the processes 204–214 that are internal to the development organization. Directional lines, for example, 216 and 218, signify data flowing between the connected processes. The processes are shown as blocks. For example, data from the project tracking process is provided to the project planning process. Each pair of parallel lines represents a data store, for example, a spread sheet or a relational database. While blocks are used to depict processes, it is contemplated that other shapes and/or graphical representations, for example, icons, could be used.

Figure 4:
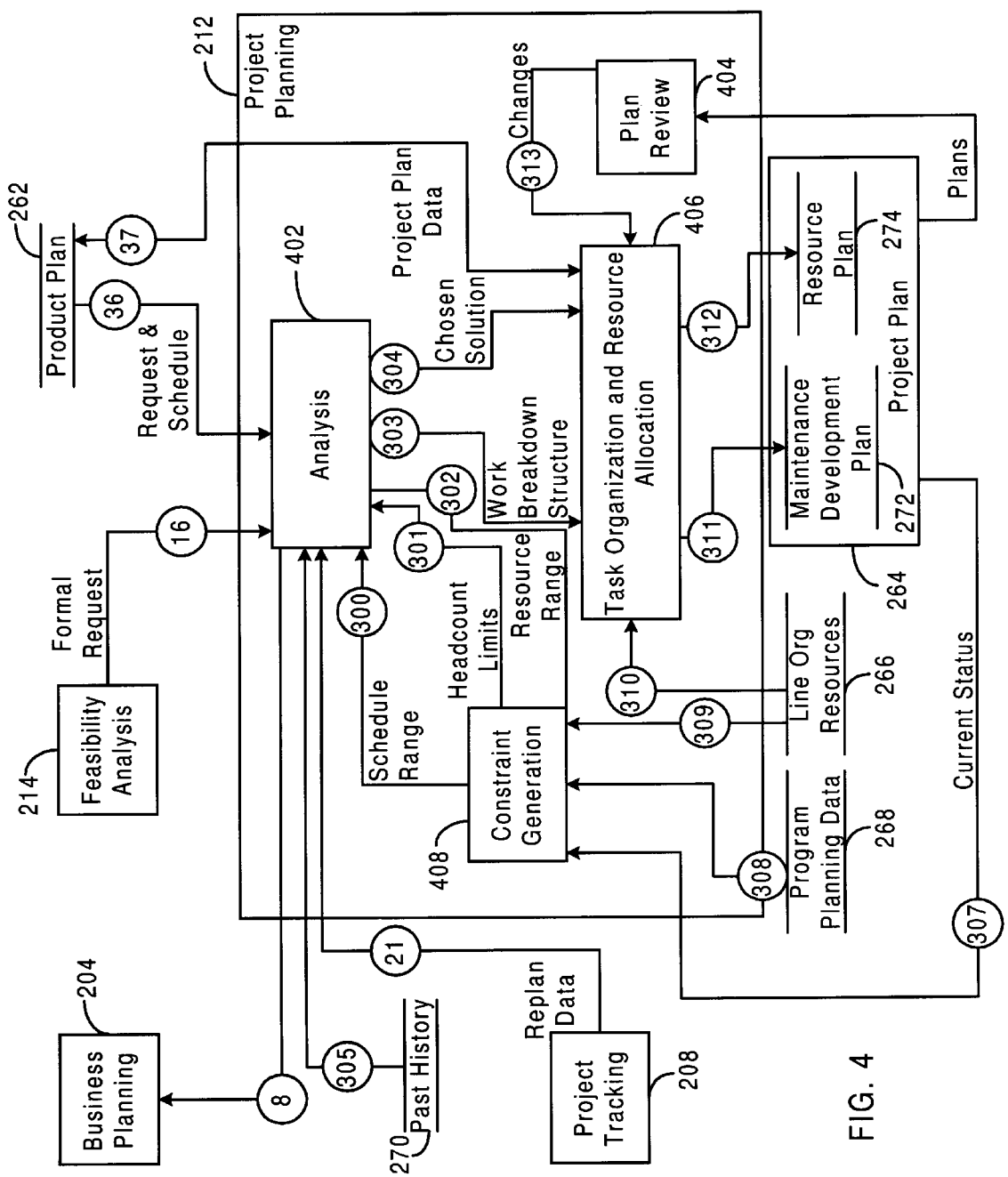
FIG. 4 illustrates a process view of the example project planning process depicted in FIG. 2.

The specific details related to the processes and data elements of the example development organization are not necessary to understand the invention, and therefore, will not be further described. However, the example process view of the development organization is illustrated to show that selection of the process tab 128 for the development organization results in a display similar to that shown in FIG. 2. Other details pertaining to the process view will be described in the process view for the project planning process 212, as shown in FIG. 4.

The view of FIG. 2 illustrates the capability provided by the present invention to hierarchically model the processes of an organization. As indicated above, the view of FIG. 2 is the first level of the hierarchy for the development organization. To further understand the details of the development organization, each of the processes 204–214 can be expanded via respective triangular portions of the blocks. For example, the project planning process 212 includes triangle 222, which can be selected with a computer based pointing device. Upon selection, a process view for the project planning process is displayed, as specifically shown in FIG. 4.

Continuing now with FIG. 3, a dynamic view of the processes of an example organization is illustrated. The dynamic view shows processes and events, the occurrence of which results in the transition from one process to another. As compared to the process view where the lines represent data, the lines of the dynamic view represent events. As with the process view of FIG. 2, the example dynamic view of FIG. 3 does not represent actual data. Rather, the example dynamic view is shown to illustrate how processes and related events are depicted in the example embodiment.

Processes in the dynamic view are depicted as blocks 204, 206, 208, 210, 212 and 214. Directional lines that connect the blocks are events. For example, line 242 represents an event that causes a transition from the project planning process 212 to the project development process 210. The process at which an event line begins is the process in which the event is caused to occur, and the process at which the event line ends is a process that is initiated as a result of the occurrence of the event. Thus, the occurrence of an event is not intended to represent in all cases the termination of a process.

It will be appreciated that multiple events may occur as part of a process. The occurrence of an event may even have a transition back to the process that caused the event. For example, the business planning process 204 causes multiple events as represented by lines 244, 246, 248, 250, and 252. It can be seen that event line 248 begins and ends at the business planning process 204. This indicates that a sub-process (not shown) within the business planning process 204 caused the event to happen and that another sub-process (not shown) within the business planning process 204 is initiated as a result of the event.

In another embodiment of the invention, the lines that represent events have associated therewith symbols and event names that are also shown in the dynamic view. For example, event line 254 represents the "requirements available" event which results in initiation of the feasibility analysis process 214. Also associated with the requirements available event is a symbol that includes, for example, a circle with the number three. It will be appreciated that other symbols, such as, alternative shapes and/or characters, or icons could be used in association with the events. The symbols can be used for cross-referencing events shown in the dynamic view with events shown in corresponding scenario views. The scenario views are described below. In addition, the symbols are elements that can be selected via a computer-based pointing device in order to display more detailed information about the events.

The process blocks 204–214 of the dynamic view include portions that can be selected via a computer-based pointing device. The triangular portions, for example, triangle 256 of the project planning process 212, are used to select for display more detailed sub-process information for the processes. For example, selection of triangle 256 results in the system displaying a dynamic view of the project planning process (See FIG. 6). Thus, the system provides the ability to visually model the hierarchical relationships of processes, data, and events of an organization.

FIG. 4 illustrates a process view of the example project planning process 212 depicted in FIG. 2. As described above, to navigate the hierarchy of process views, a user can select triangle 222 of the project planning process block 212 of FIG. 2. This causes the system to display the process view for the project planning process.

The project planning process 212 includes an analysis process 402, a plan review process 404, a task organization and resource allocation process 406, and a constraint generation process 408. The external processes that directly exchange data with the project planning process 212 are the business planning process 204, project tracking process 208, and feasibility analysis process 214. The various data elements are shown as directional lines with numbered circles 8, 16, 21, 36, 37, 300, 301, 302, 303, 304, 305, 307, 308, 309, 310, 311, 312, and 313. In the example, some of the data element lines have names associated therewith, such as the name of the data element represented by line 300 is "schedule range."

Example data stores 262, 264, 266, 268, and 270 illustrate where processes 402, 404, 406, and 408 of the project planning process 212 store and obtain data. Note that project plan data store 264 includes a maintenance/development plan data store 272 and a resource plan data store 274. The details of the specific data elements and data stores, as well as the processes, illustrated in FIG. 4 are those defined for a particular example project planning process within a particular development organization. Other organizations would likely have different organizational process and data element definitions.

Figure 5:
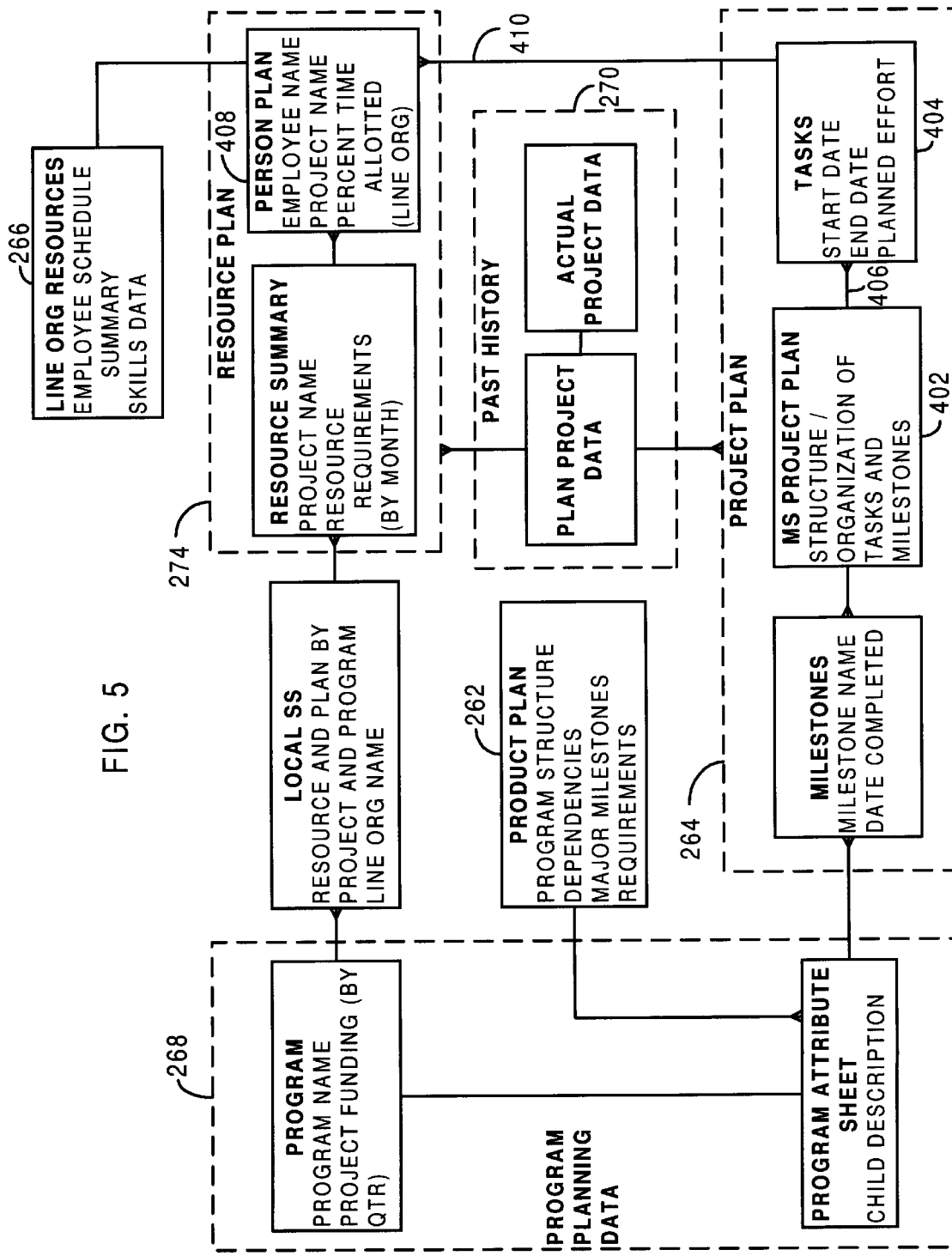
FIG. 5 illustrates a data view of data stores referenced by the processes that comprise the example project planning process.

FIG. 5 illustrates a data view of data stores referenced by the processes that comprise the example project planning process 212. FIG. 4 also shows the data stores 262–274 referenced by the project planning process 212. However, it will be appreciated that the data view offers additional details on the particular information and interrelationship stored in the various data stores.

Each data element in the data view is shown as a block, with relationships between elements shown as lines that connect the blocks. Attributes of each data element are shown below the element name in the box that represents the data element. The data view is useful to show cardinal relationships between data types and to show specific attributes of data entities. The data view can be used to identify and eliminate duplicated data and thereby simplify the associated process view and the real-world organizational processes.

In the example data view, some of the relationship lines include forked ends. For example, the project plan data store 264 includes an MS Project Plan data element 402 that is connected to Tasks data element 404 via forked line 406. This signifies that each MS Project Plan data element 402 is comprised of one or more Task data elements 404. Each Task data element 404 includes a start date attribute, an end date attribute, and a planned effort attribute. It will also be appreciated that the Task data element 404 is connected to the Person Plan data element 408 via relationship line 410. A Person Plan data element includes an employee name attribute, a project name attribute, etc. Thus, each Task data element 404 may be related to one or more Person Plan data elements 408.

The data view of FIG. 5 for the project planning process 212 is displayed in response to an input selection signal for the particular data view. For example, a data tab, similar to data tab 132 of FIG. 1, can be selected with a computer-based pointing device in the context of a view of the project planning process 212, and software responds to the signal by presenting the data view for the project planning process 212.

Figure 6:
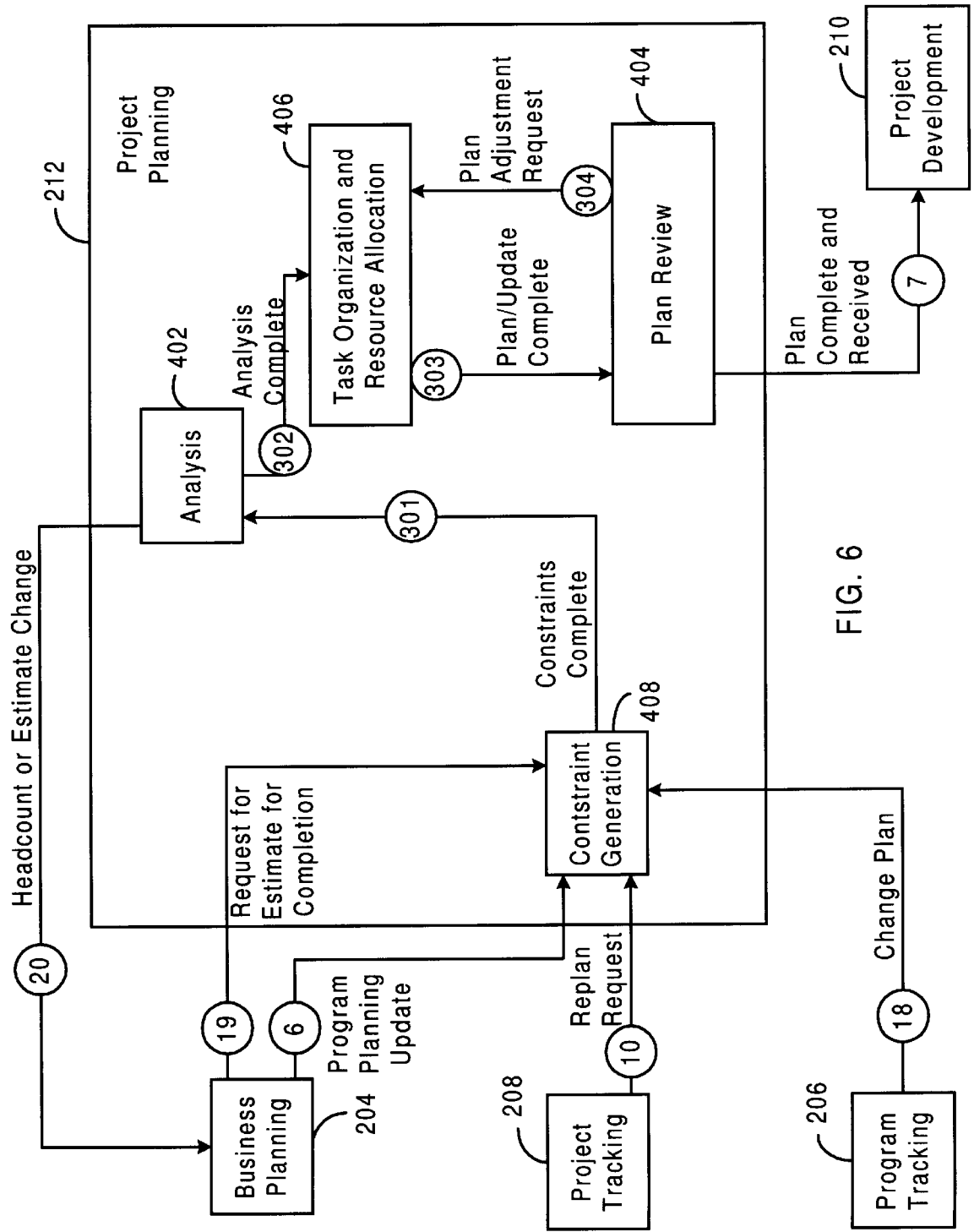
FIG. 6 illustrates a dynamic view of an example project planning process.

FIG. 6 illustrates a dynamic view of an example project planning process 212. The dynamic view is used to show all possible paths of events that lead from one process to another. Thus a "path" is used herein to refer to a collection of events whose occurrences lead from a first work performed in a first process to work performed in a second process. Each event may be considered as something that must occur before work transitions from one process to another.

A first example path begins at the business planning process 204 and ends at the project development process 210. A program planning data update event 6 results in initiation of activities within the constraint generation process 408. As a result of work performed in the constraint generation process 408, a constraints complete event 301 occurs, and the analysis process 402 is initiated. When analysis is complete, event 302 leads to the task organization and resource allocation process 406. When process 406 completes the plans, the plan review process 404 is initiated as shown by event line 303. The occurrence of the plan complete and reviewed event 7 leads to the project development process.

It will be appreciated that additional paths are depicted in the example dynamic view which are particular to the processes of the example development organization. Different organizations will have different processes and paths that interconnect them according to the work performed by the organization.

Figure 7:
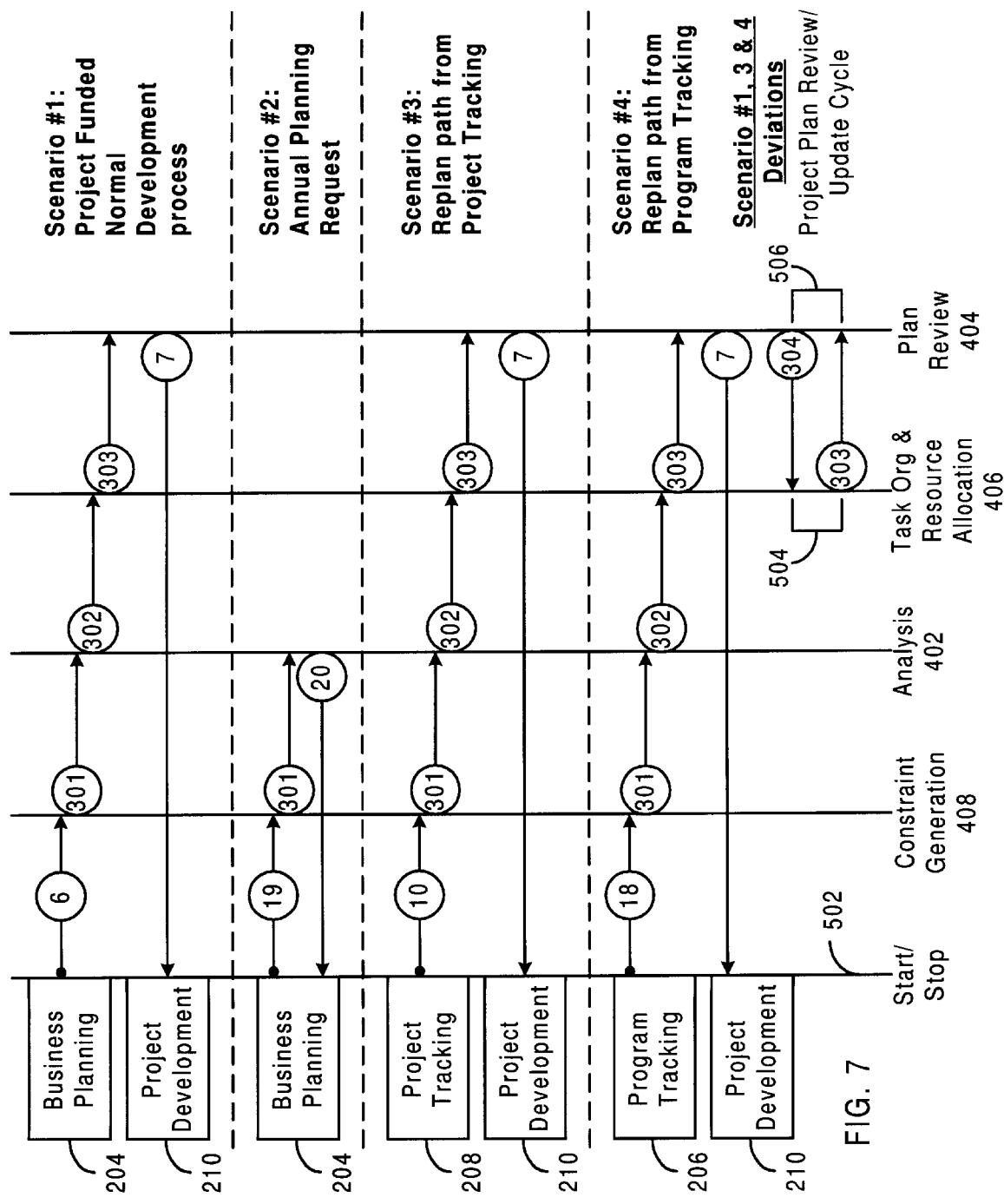
FIG. 7 illustrates a scenario view of the example project planning process.

FIG. 7 illustrates a scenario view of the example project planning process 212. Generally, the system provides the capability to define scenarios so that individual groups can define how they operate within an organization because oftentimes there are variations in the manner in which different groups operate in the context of a large organization. For example, the overall scenario for developing a large scale computer system would be substantially different from the scenario for changing an existing design in response to a user reported problem. While the scenarios are different, each relates to the various processes of the development organization and each must fit within that context.

The example scenario view of FIG. 7 includes multiple scenarios, wherein each scenario depicts a path from one process to another. Four example scenarios numbered 1, 2, 3, and 4 are shown in the scenario view. Scenario #1 shows the events that occur relative to the project planning process 212 in a normal development activity; scenario #2 shows the events relative to the project planning process 212 in annual planning request; scenario #3 shows the events relative to the project planning process where a project re-plan event occurs as a result of the project tracking process; and scenario #4 shows the events relative to the project planning process where a project re-plan event occurs as a result of the program tracking process 206.

Sub-processes (constraint generation 408, analysis 402, task allocation 406, and plan review 404) of the project planning process are, in contrast to the process and dynamic views, illustrated as vertical lines. Processes (business planning 204, project development 210, project tracking 208, and program tracking 206) that are external to the project planning process are shown as blocks on the left hand side of the scenarios. A start/stop line 502 and the blocks 204–210 are used to show the processes at which scenarios begin and end.

The events are shown as directional lines that connect the vertical lines of the processes 402–408. Associated with each directional line is a symbol, for example, a circle with a number, that uniquely identifies the event. Other symbols could be used to reference the events. The events depicted in the scenario view of FIG. 7 correspond to the events depicted in the dynamic view of FIG. 6. Events that occur between sub-processes of the project planning process are shown as having circles for their symbols. The attributes for a given event are displayed in response to user selection of the symbol for the event.

Scenario #1, as previously explained in an example along with FIG. 6, begins at the business planning process 204 and ends at the project development process 210. A program planning data update event 6 results in initiation of activities within the constraint generation process 408. As a result of work performed in the constraint generation process 408, a constraints complete event 301 occurs, and the analysis process 402 is initiated. When analysis is complete, event 302 leads to the task organization and resource allocation process 406. When process 406 completes the plans, the plan review process 404 is initiated as shown by event line 303. The occurrence of the plan complete and reviewed event 7 leads to the project development process 212.

Each event is identified by a name and includes a set of attributes. The set of attributes includes an event number, a description, and zero or more CERF (criterion, evidence, responsibility, failure) records. The event number is a reference number that is used to locate the event within a database of event definitions. The description is a short textual definition of the event that is displayed in a listing of event definitions. Shaded circles represent events which are key transitions for the scenario. For example, there may be specific data required by an audit process that is expected to occur as a result of the event. Links to databases that contain the evidence are provided so that a user can obtain the records.

Each CERF record is comprised of a definition attribute that sets forth precisely what the criterion is, an evidence attribute that indicates what particular records must exist to document that the criterion was met, a responsibility attribute that indicates who is responsible to ensure that the criterion is met and evidence exists for this particular CERF record, and a failure attribute that indicates what course of action to take if the event occurs but the CERF requirements are not complete.

A deviation path may optionally be defined for a scenario. A deviation path can be thought of as an exception to a scenario that occurs in the planned path. Alternatively, a deviation path can be viewed as an alternate path that is followed when a criterion is not met. A deviation path for the example scenarios #1, #3, and #4 of FIG. 7 is shown at the bottom of the scenario view. Specifically, if a criterion of the plan complete and reviewed event number 7 (See also FIG. 6) fails and that criterion's failure attribute includes a plan adjustment action, a plan adjustment event 304 occurs (See also FIG. 6) and activities within the task organization and resource allocation process are initiated. Thereafter, when the plan has been updated, as indicated by event 303, the plan review process is again initiated. The dark square brackets 504 and 506 on the sides of the deviation path indicate that the transitions between the processes may be repeated an arbitrary number of times. It will be appreciated that event loops, for example the loop depicted by brackets 504 and 506, could also be used in the general scenario and not just the deviation path. The usage of event loops will vary according to the particular organization and process being modeled.

Figure 8:
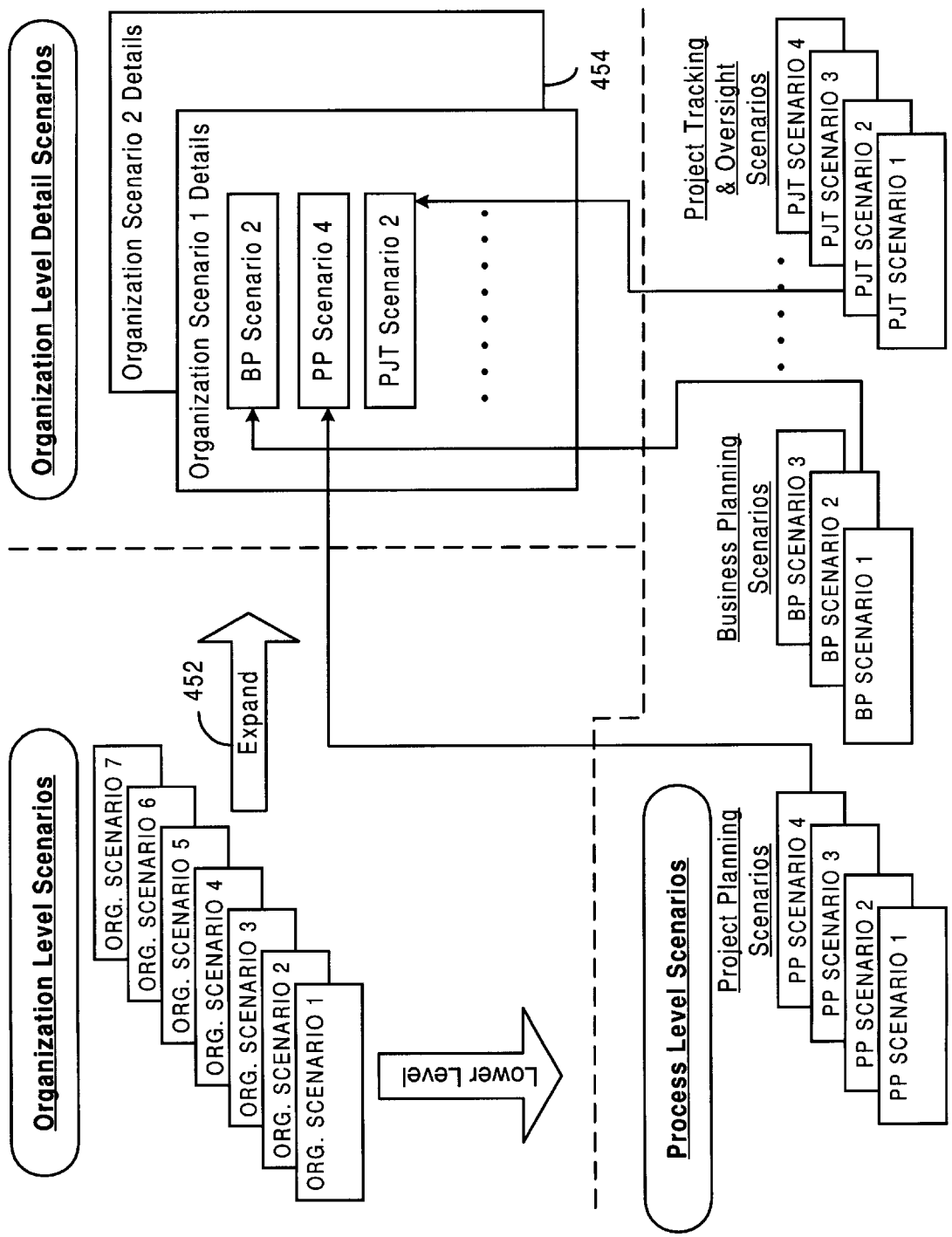
FIG. 8 illustrates the hierarchical relationship between organization level scenarios and process level scenarios.

FIG. 8 is a block diagram that illustrates hierarchical relationships between scenarios in accordance with an example embodiment of the invention. FIGS. 9A–9H include specific example scenarios that further illustrate the hierarchical relationship between organization level scenarios and process level scenarios.

Figure 9A:
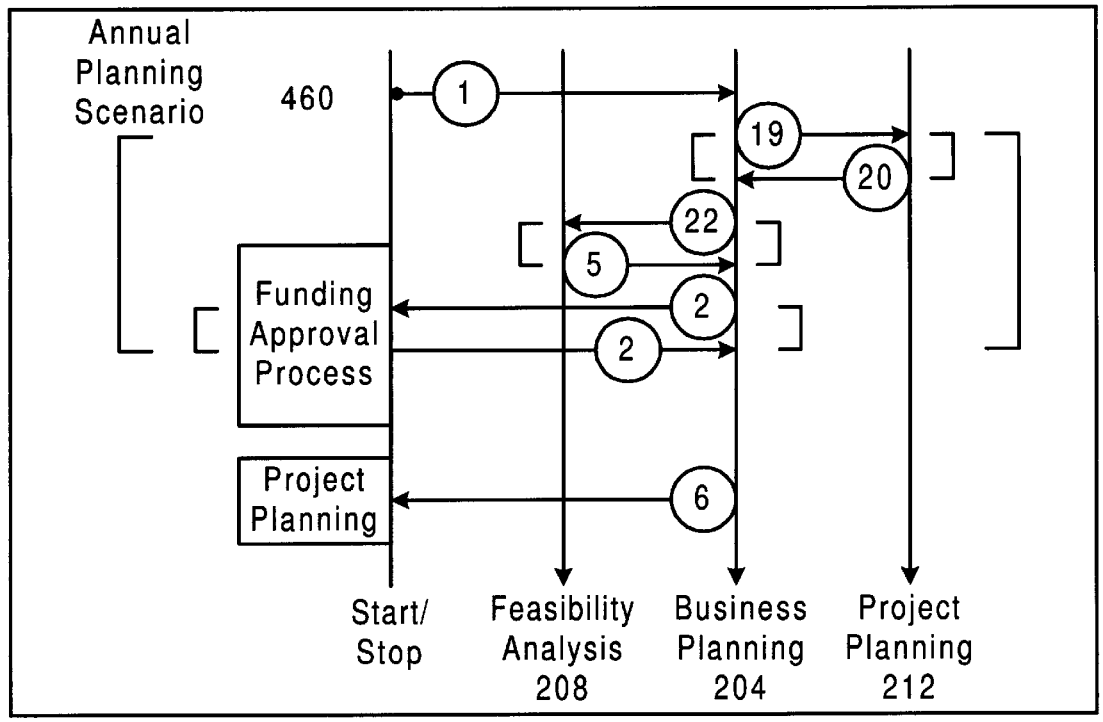
FIG. 9A illustrates a specific example organization level scenario.

Referring first to FIG. 8, organization level scenarios include blocks labeled as "org. scenario 1" through "org. scenario 7." An example organization level scenario, the "Annual Planning Scenario," is shown in FIG. 9A. Each organization level scenario is comprised of, and can be expanded and viewed as, one or more process level scenarios, as depicted by "expand" arrow 452. An example is shown in FIG. 8 in which organization scenario 1 is expanded and shown as including business planning (BP) scenario 2, project planning (PP) scenario 4, project tracking and oversight (PJT) scenario 2, and possibly additional process level scenarios. FIGS. 9B, 9C, 9D, 9E, 9F, 9G, and 9H are example process level scenarios that are included in the Annual Planning Scenario of FIG. 9A. In an example embodiment, the collection of process level scenarios that comprise an organization level scenario are displayed upon user selection of a system provided input option, such as a graphical user interface button or hypertext link.

The invention provides for definitions of multiple process level scenarios. In the example organization, there are PP scenarios 1–4, BP scenarios 1–3, and PJT scenarios 1–4. Other process level scenarios can be defined according to the particular procedures of the organization. As illustrated in FIG. 8, the context in which a process level scenario is utilized can be determined from the organization level scenario in which it is used. For example, organization scenario 1 includes PP scenario 4.

FIG. 9A illustrates an example organization level scenario named, "Annual Planning Scenario." For ease of reference, the scenario is shown and referred to as block 460. The vertical lines represent the feasibility analysis process 208, business planning process 204, and project planning process 212. The example Annual Planning Scenario 460 is shown to illustrate the relationship between it as an organization level scenario and the process level scenarios that comprise it. FIGS. 9B–9H illustrate the example process level scenarios that comprise the Annual Planning Scenario 460. Relative to FIG. 8, the organization level scenario of FIG. 9A corresponds to one of organization scenarios 1–7 of FIG. 8, and the example process level scenarios of FIGS. 9B–H correspond to blocks within a corresponding organization scenario details block, 454 for example.

Figure 9B:
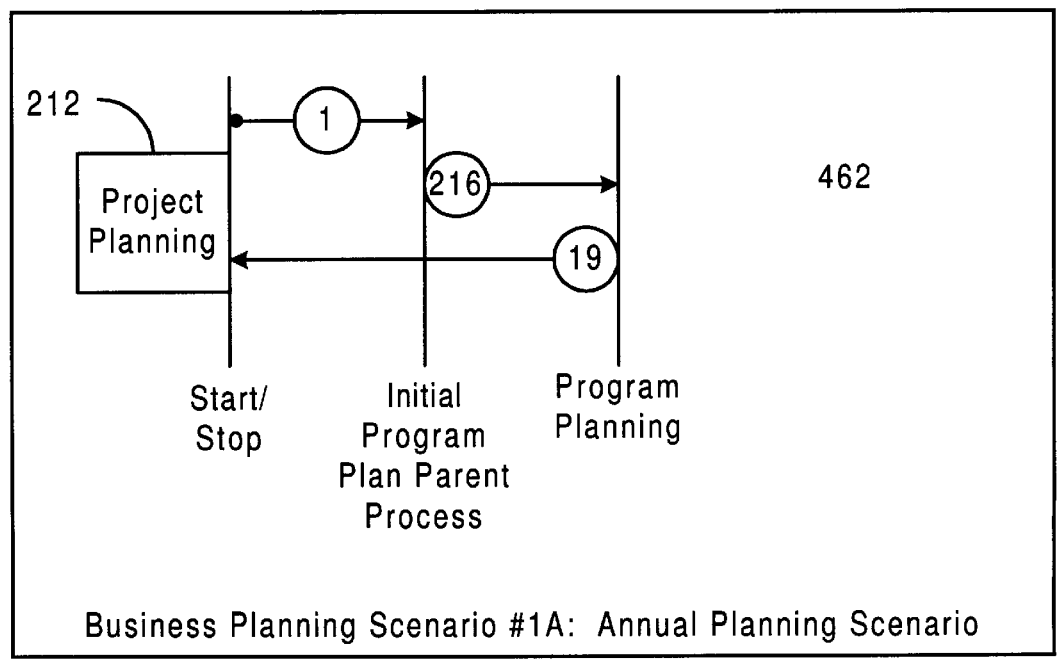
FIGS. 9B–H illustrate specific example process level scenarios that comprise the organization level scenario of FIG. 9A.

A first process level scenario named, "Business Planning Scenario #1A," and shown as block 462 is shown in FIG. 9B. It should be noted that the example event numbers, while corresponding between FIGS. 9A–H, do not correspond to and should not be confused with any identical process reference numbers used elsewhere in this specification. Scenario 462 provides details of the processes within the business planning process 204 that are utilized in one business planning scenario. Note that in FIG. 9A, event 1 transitions from the start/stop line to the business planning process 204, and event 19 transitions from the business planning process 204 to the project planning process 212. Thus, there are processes that are utilized within the business planning process 204 between when event 1 transitions into the business planning process 204 and when event 19 transitions from the business planning process 204. As shown in scenario 462 of FIG. 9B, event 1 transitions into a process named "Initial Program Plan Parent Process," (the details of which do not require explanation to understand the invention) which is a process within the business planning process 204. Event 216 transitions to a program planning process. Event 19, which corresponds to event 19 depicted in FIG. 9A, transitions to the project planning process 212.

Figure 9C:
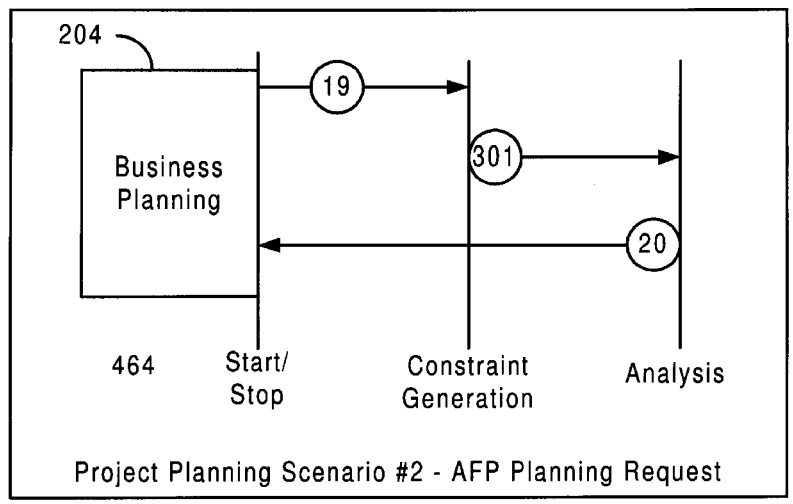
Figure 9D:
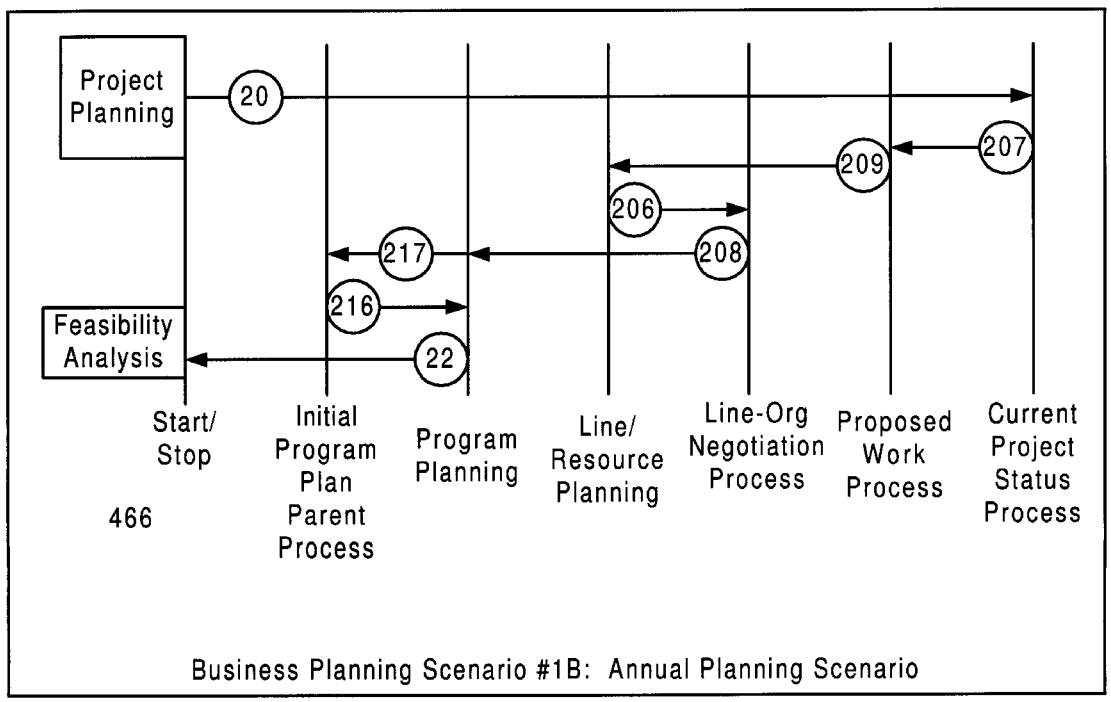
Figure 9E:
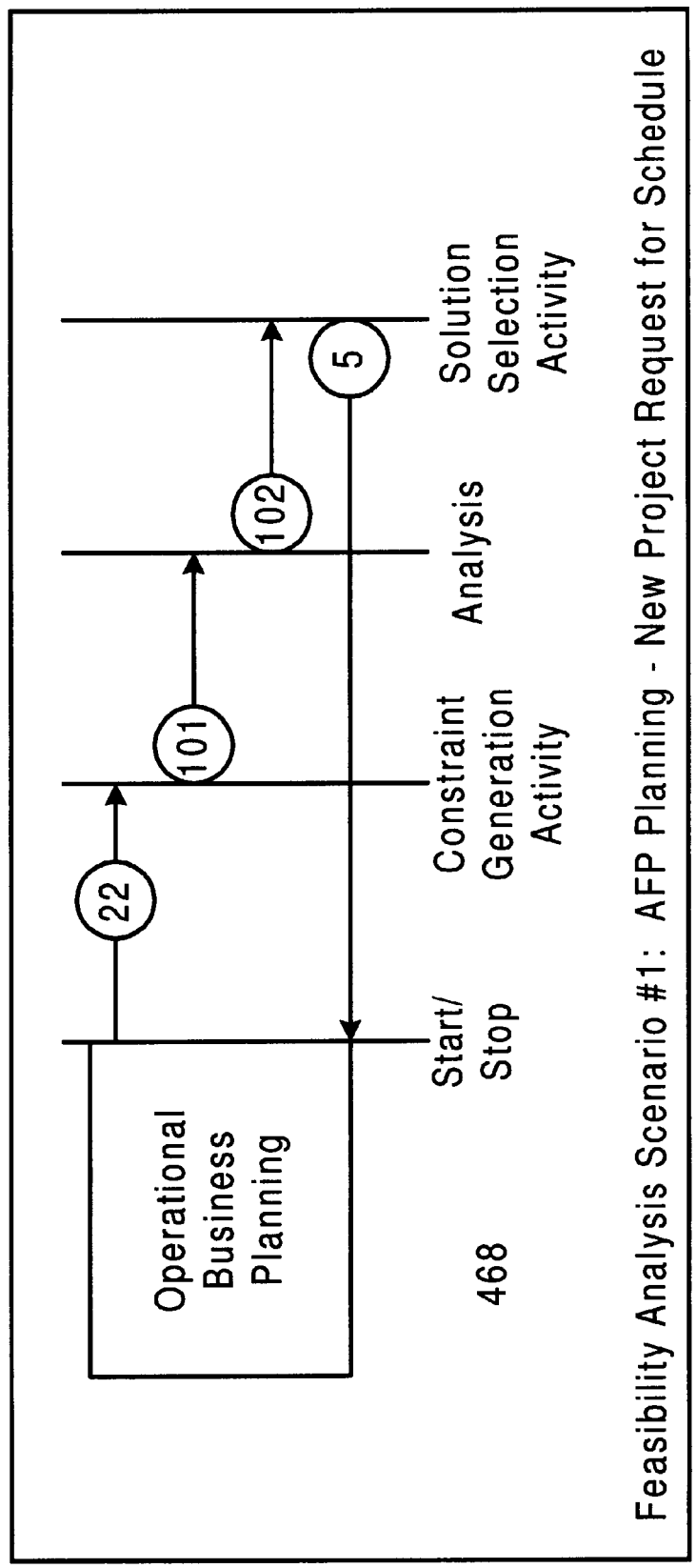
Figure 9F:
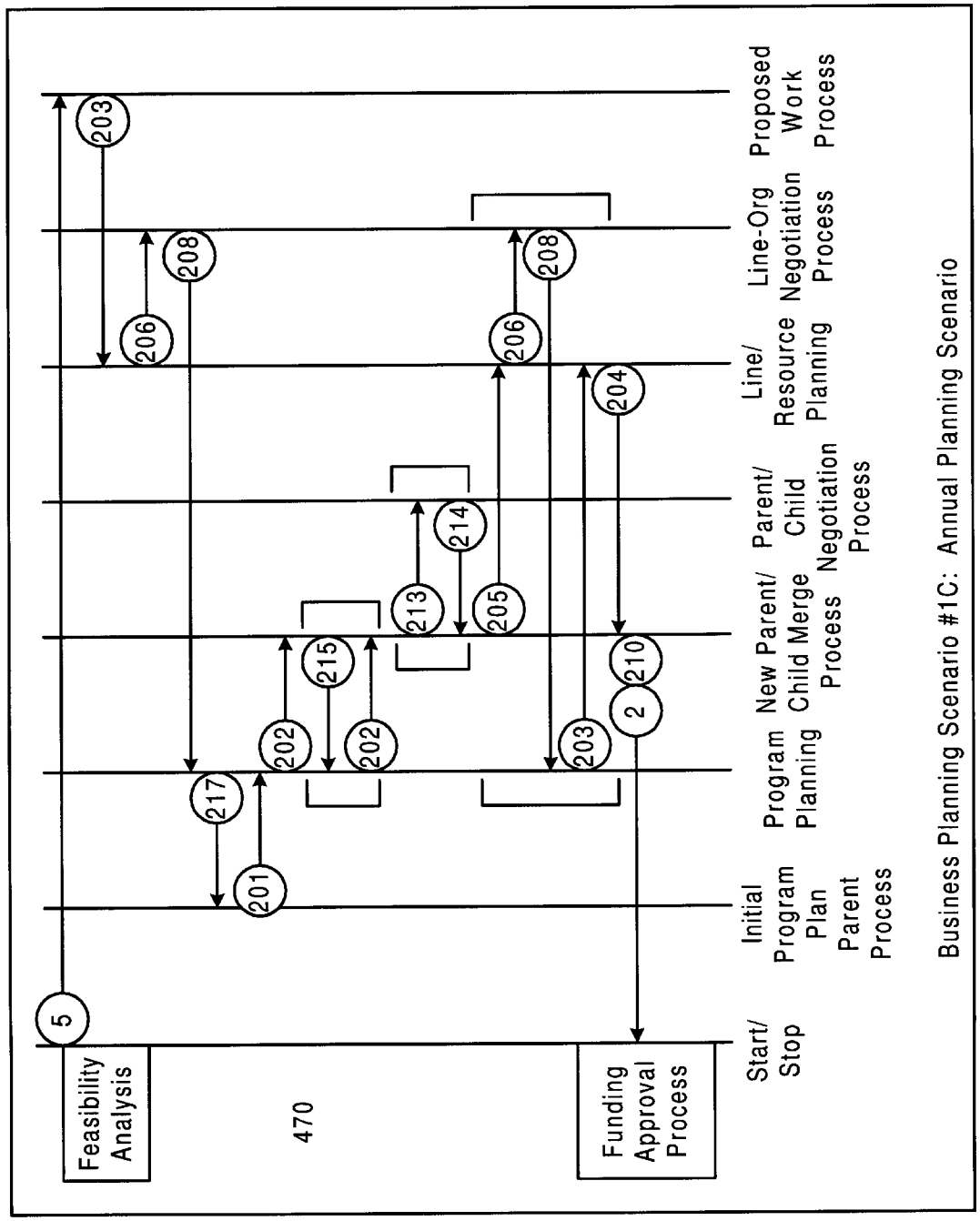
Figure 9G:
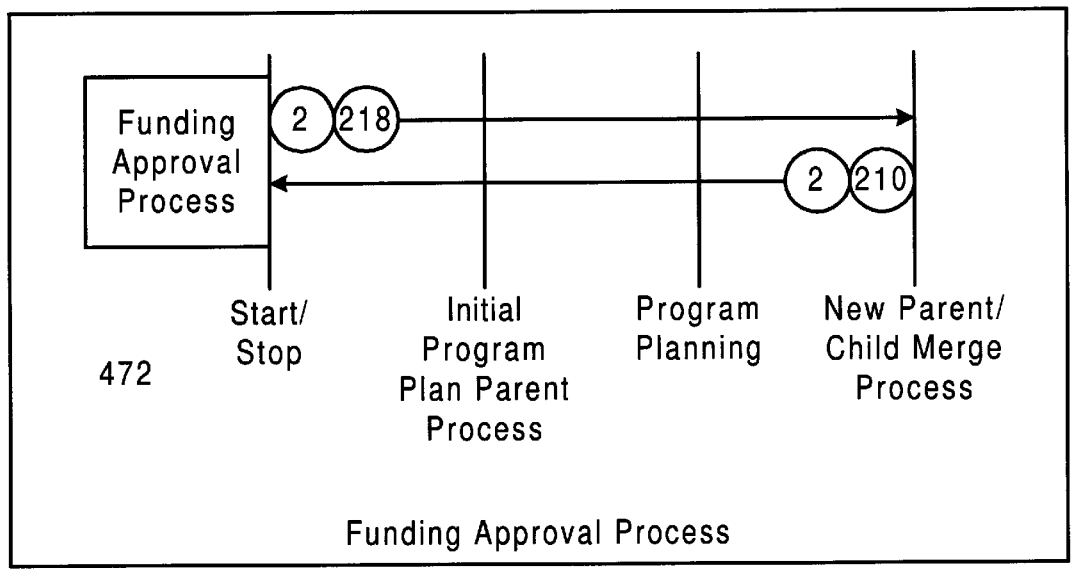
Figure 9H:
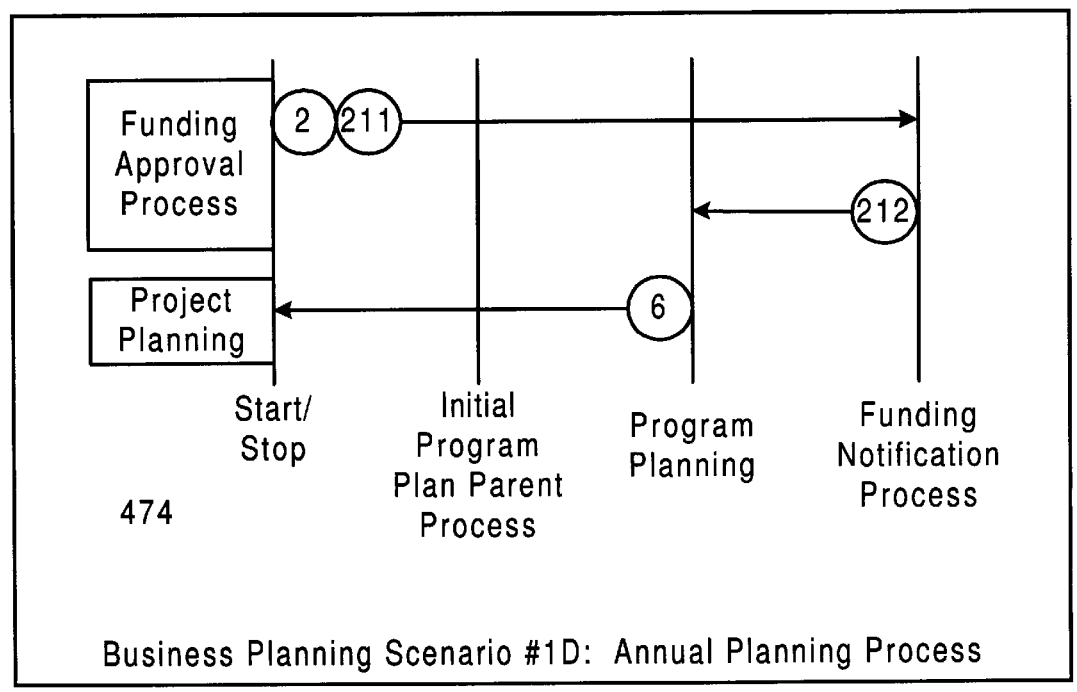

FIG. 9C illustrates a process level scenario named, "Project Planning Scenario #2," and shown as block 464. Scenario 464 illustrates an example project planning scenario that complements the business planning scenario 462 of FIG. 9B. It will be appreciated that event 19 transitions to the project planning process 212 in FIG. 9B, and event 19 transitions from the business planning process 204 to the constraint generation process within scenario 464 of FIG. 9C. This illustrates the continuity of process level scenarios within the example organization level scenario 460 of FIG. 9A.

FIGS. 9D–H illustrate additional process level scenarios 466, 468, 470, 472, and 474 that comprise the example organization level scenario 460 of FIG. 9A. It will be appreciated that for a given process type, for example, the business planning process 204, an organization level scenario may include multiple process level scenarios. In the illustrated example of FIGS. 9A–H, process level scenarios 462, 466, 470, and 474 are all process level scenarios within the business planning process 204 which relate to the organization level scenario 460.

Figure 10:
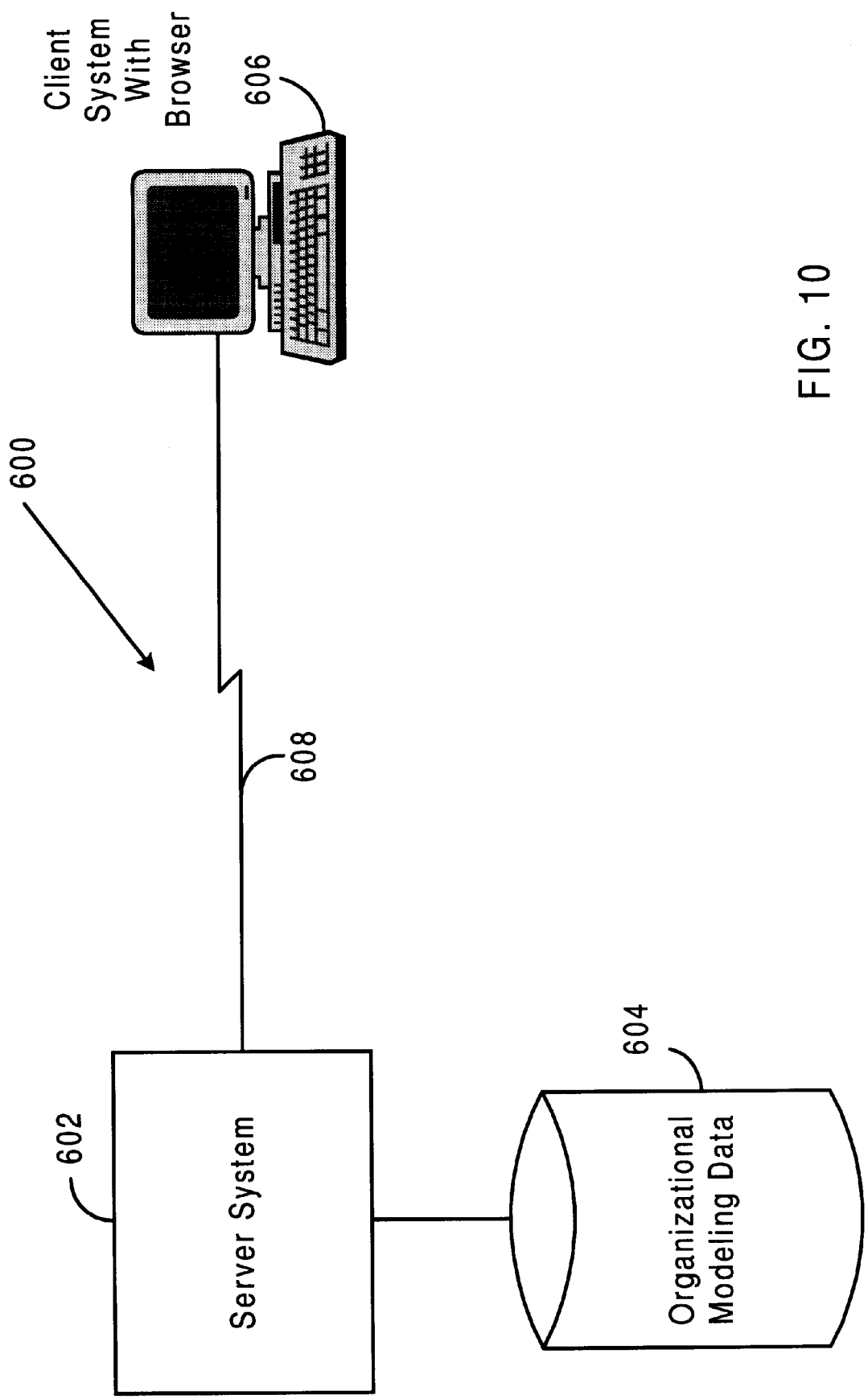
FIG. 10 is a functional block diagram of a data processing environment in which the present invention may be implemented according to an example embodiment of the invention.

FIG. 10 is a functional block diagram of a data processing environment in which the present invention may be implemented according to an example embodiment of the invention. The system 600 of FIG. 10 includes a server system that is coupled to a data storage element 604, and a client system 606 that is coupled to the server system via network 608.

Data store 604 includes the organizational modeling data that is used to generate the process, data, dynamic, and scenario views as described above. The database can be implemented for example, using an ODBC-compliant database system such as Microsoft Access. Other known database systems could also be used. The modeling data includes definitions of processes, sub-processes, events, data elements, and scenarios as described above, as well as criteria, evidence, responsibility, and failure (CERF) data.

The server system 602 is a conventional data processing system, for example a network server class system, that provides access to the organizational modeling data of data store 604. The access is provided in response to requests from client systems, such as 606, that are coupled to network 608. It will be appreciated that network 608 could be an internet or an intranet. In the example embodiment, the client system 606 runs browser software for requesting and displaying HTML data. Thus, it will be appreciated that a user at a client system initiates a request for organizational modeling data to the server system 602. The server system 602 includes HTML server software (not shown) that includes a database interface and software for responding to the client system 606 with HTML formatted data that includes the organizational modeling data along with Javascripts for providing on-screen functions at the client system. Such on-screen functions include, for example, the capability to navigate from a process view to a data view.

Figure 11:
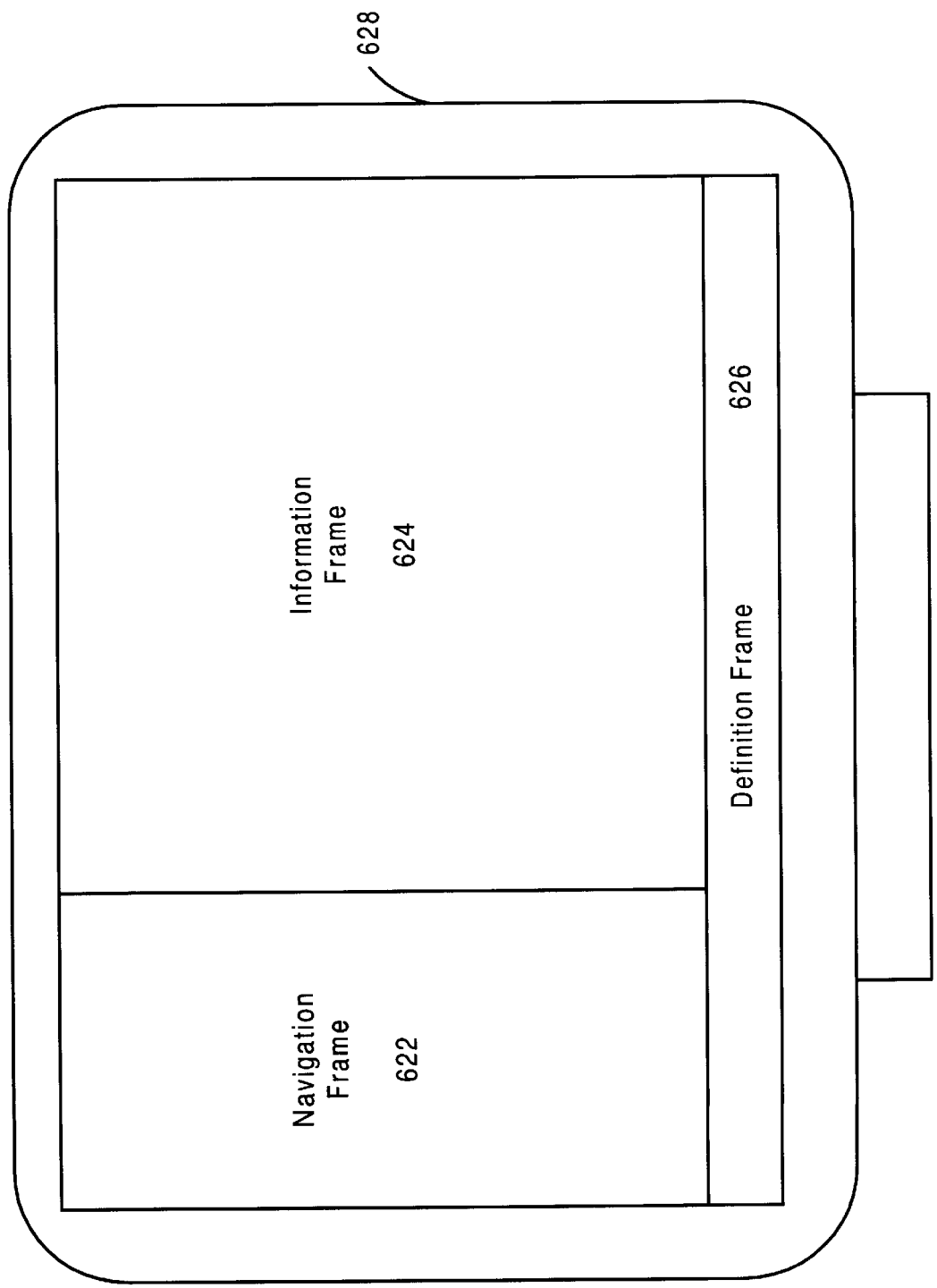
FIG. 11 illustrates presentation of the organizational modeling data in three frames in a further embodiment of the invention.

Continuing now with FIG. 11, in a further embodiment of the invention, the organizational modeling data is presented in three frames that include a navigation frame 622, an information frame 624, and a definition frame 626. The frames 622–626 are illustrated within a computer monitor 628.

The information frame 624 is the main frame in which viewing and interaction with the system occurs. The example views of FIGS. 1–7 and FIGS. 9A–H are presented in the information frame 624. The navigation frame 622 includes a set of Javascript buttons that allow a user to change views within the organizational hierarchy of processes. Example buttons may include buttons to select between process, data, dynamic, and scenario views for a process. In addition, buttons are provided for changing the level of view within the organizational process model hierarchy (See the explanation of the transition from FIG. 2 to FIG. 4). The definition frame 626 is the portion of the screen in which definitions of processes, data elements, and events are displayed. Each of the frames 622–626 includes scrollbars for controlling which data are viewable.

Three mechanisms are provided in the example system for viewing or updating the organizational modeling data. The three mechanisms include graphical navigation as shown in FIG. 12, button navigation as shown in FIG. 13, and definition review/update as shown in FIG. 14.

Figure 12:
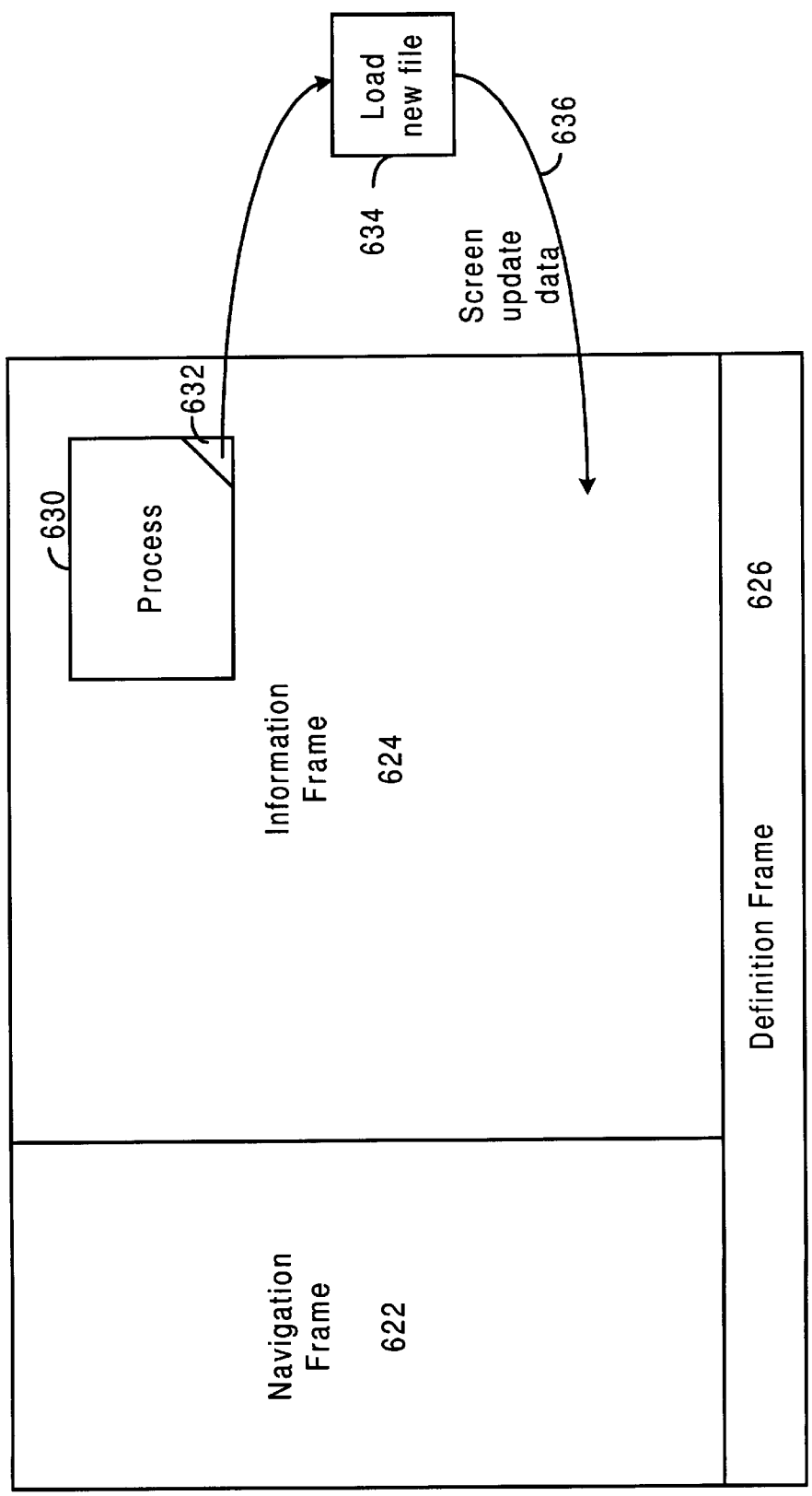
FIG. 12 is a functional block diagram showing how an example embodiment of the invention provides graphical navigation capabilities.

FIG. 12 is a functional block diagram showing how an example embodiment of the invention provides graphical navigation capabilities. The graphical navigation capability allows selection of display of a different level of an organizational process hierarchy, according to an example embodiment of the invention. Within information frame 624 an example process block 630 is shown. The process block 630 is a portion of a larger process view or dynamic view where the rest of the view is not shown for the purpose of convenience.

The triangle 632 is mapped using a graphical mapping tool, for example, "Map This!", whereby clicking within the triangle causes navigation to the appropriate page. The determination of the appropriate page is made based upon the particular process that contains the triangle 632, the current level, and the current type of view, for example, process or dynamic. This current information is provided to a function 634 to load new file data. Specifically, the load new file function 634 is implemented as a Javascript function. A new HTML page, shown as screen update data line 636, is then sent from the server system 602 to the client system 606, for example. When an HTML page is loaded, new Javascript variables are set denoting the current level, current view, and file type.

Figure 13:
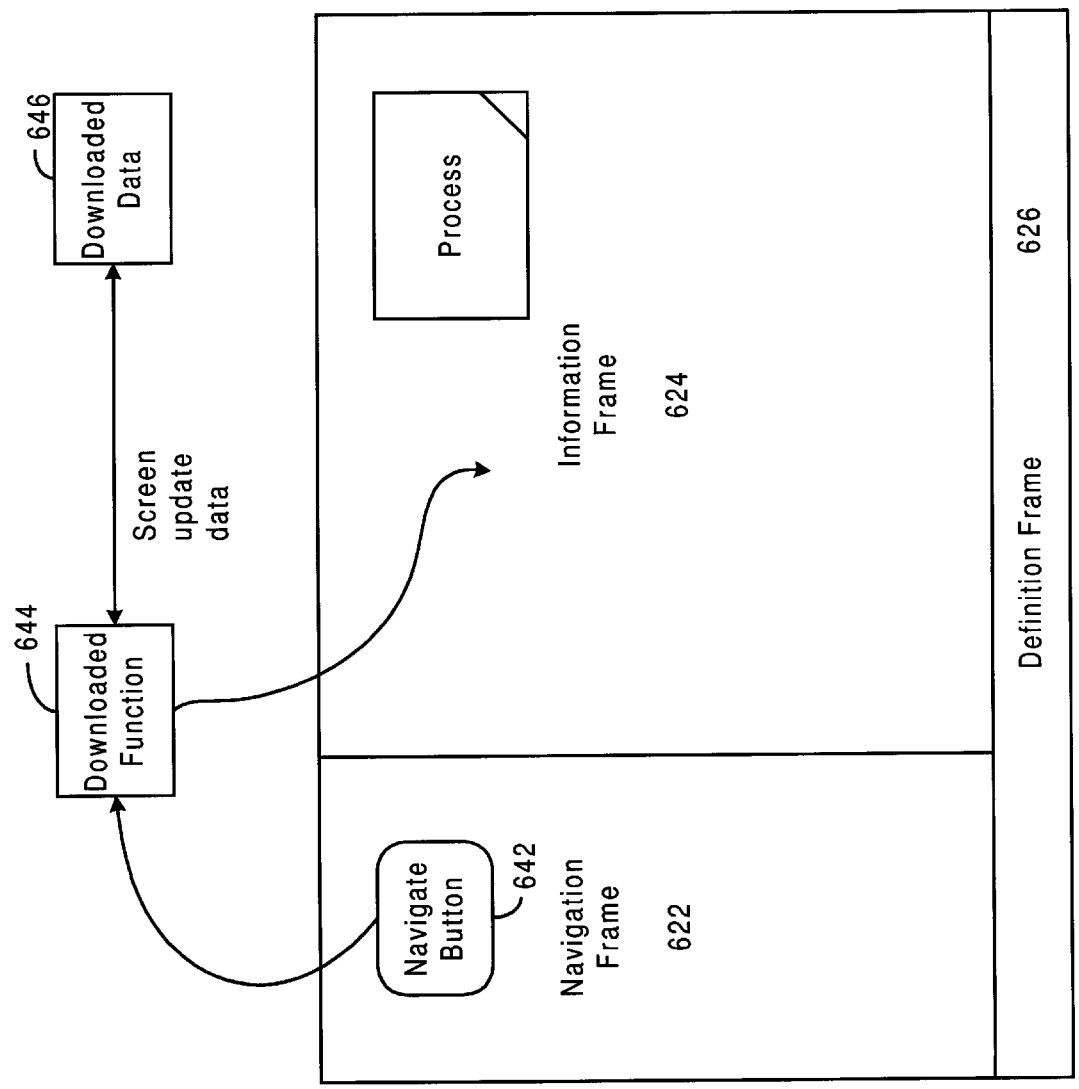
FIG. 13 is a functional block diagram showing how an example embodiment of the invention provides button navigation capabilities.
Figure 14:
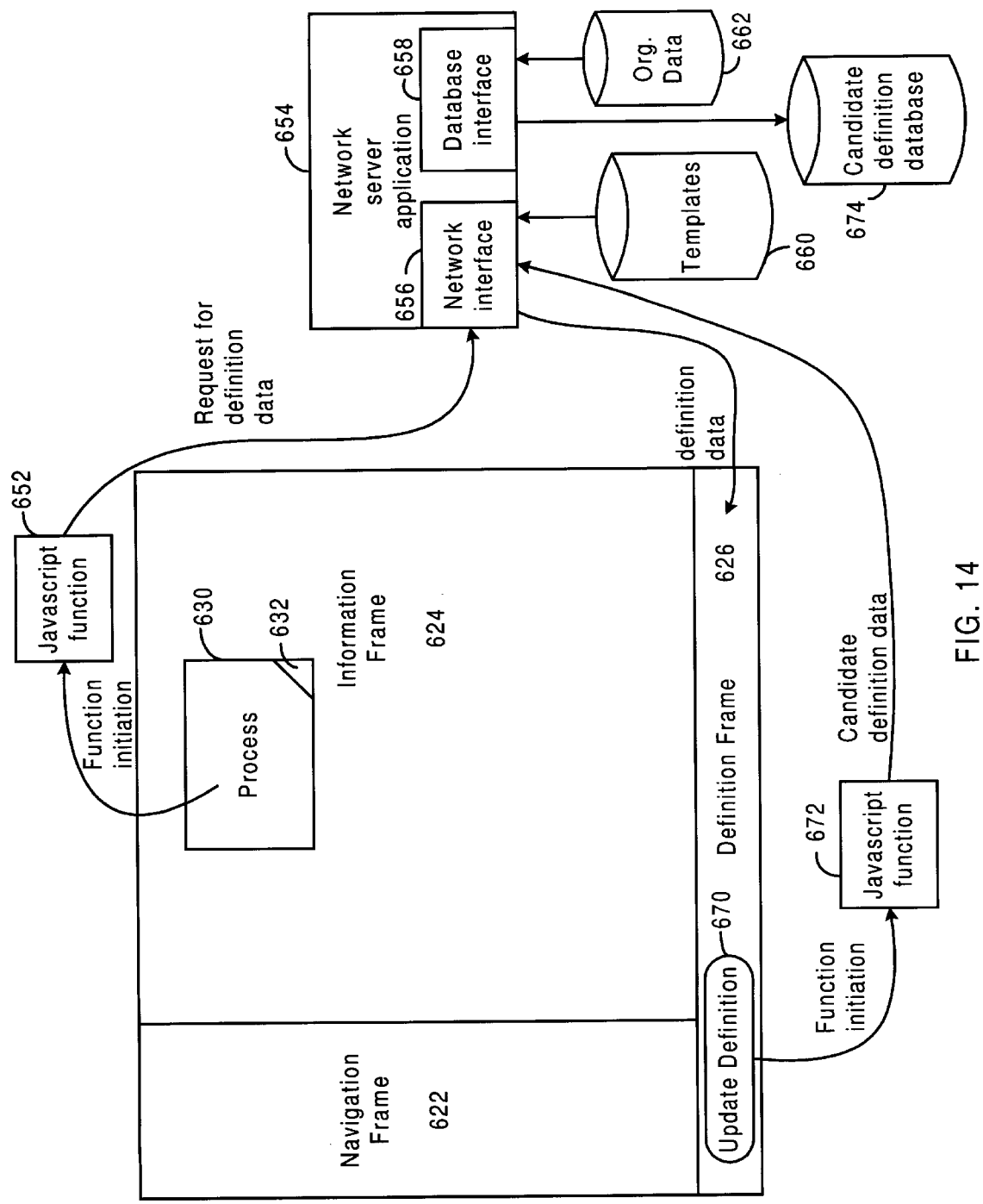
FIG. 14 is a functional block diagram showing how an example embodiment of the invention provides access to the definitions of processes, data elements, and events of an organizational data model.

FIG. 13 is a functional block diagram showing how an example embodiment of the invention provides button navigation capabilities. The button navigation capability allows a user to navigate to other views at the same level, or upward in the organizational process hierarchy by clicking on the appropriate button in the navigation frame 622. Each button has an associated Javascript function. The Javascript function checks the current level, view, and type and generates a new file name based on the request. The new file is then loaded into the information frame 624, and the stored Javascript data is updated to reflect the new name.

In the navigation frame 622, a navigate button 642 is shown. The navigate button 642 is mapped to a previously downloaded function 644. The function 644 references previously downloaded data 646 to obtain the organizational model data needed to update the view in the information frame 624.

FIG. 14 is a functional block diagram showing how an example embodiment of the invention provides access to the definitions of processes, data elements, and events of an organizational data model. Predetermined areas of a view are mapped, using a tool such as Map This!, to Javascript functions. For example, the area within block 630 of the example process, excluding triangle is mapped to Javascript function 652. When a user clicks within the mapped area, for example with a mouse, the Javascript function 652 is initiated.

The Javascript function 652 interfaces with a network server application 654 implemented using Cold Fusion software from Allaire or Active Server Pages from Microsoft. The server application includes a network interface 656, such as an HTML server, and a database interface 658 such as an ODBC interface. The server application obtains the appropriate template from a template file 660, reads the necessary data from the database 662, and creates an HTML page (not shown) to return to the example client system 606 (FIG. 10). The client system 606 displays the new data in the definition frame 626.

For each process, data element, and event, the definition presented in the definition frame 626 includes an option for updating the definition via an update button, for example, button 670. Button 670 is mapped to an update definition Javascript function 672. Selection of the update definition button 670 initiates function 672, which provides the user with an editable text area (not shown) that is initialized with present definition data. The user can update the definition data or create an entirely new definition and then submit the candidate definition data for review by other personnel in the organization. The server application 654 receives the candidate definition data and stores it in a candidate definition database 674.

For scenarios, each event has both an event definition and associated event criteria, evidence, responsibility, and failure (CERF) records. There may be one or more CERF entries for any given event. Similar to the definition data described above, the CERF data can be updated, and in addition a new CERF entry can be made.

In a dynamic view, an event definition can be updated. It is also possible for a user to define CERF data that applies to all scenarios. In a given scenario view, only the CERF data may be updated, and that data becomes a record for that particular instance of the event in the given scenario. This means that an event that occurs multiple times in a scenario can have different CERF information. The database CERF table uses the event number, scenario number, and event instance number as a key value.

Figure 15:
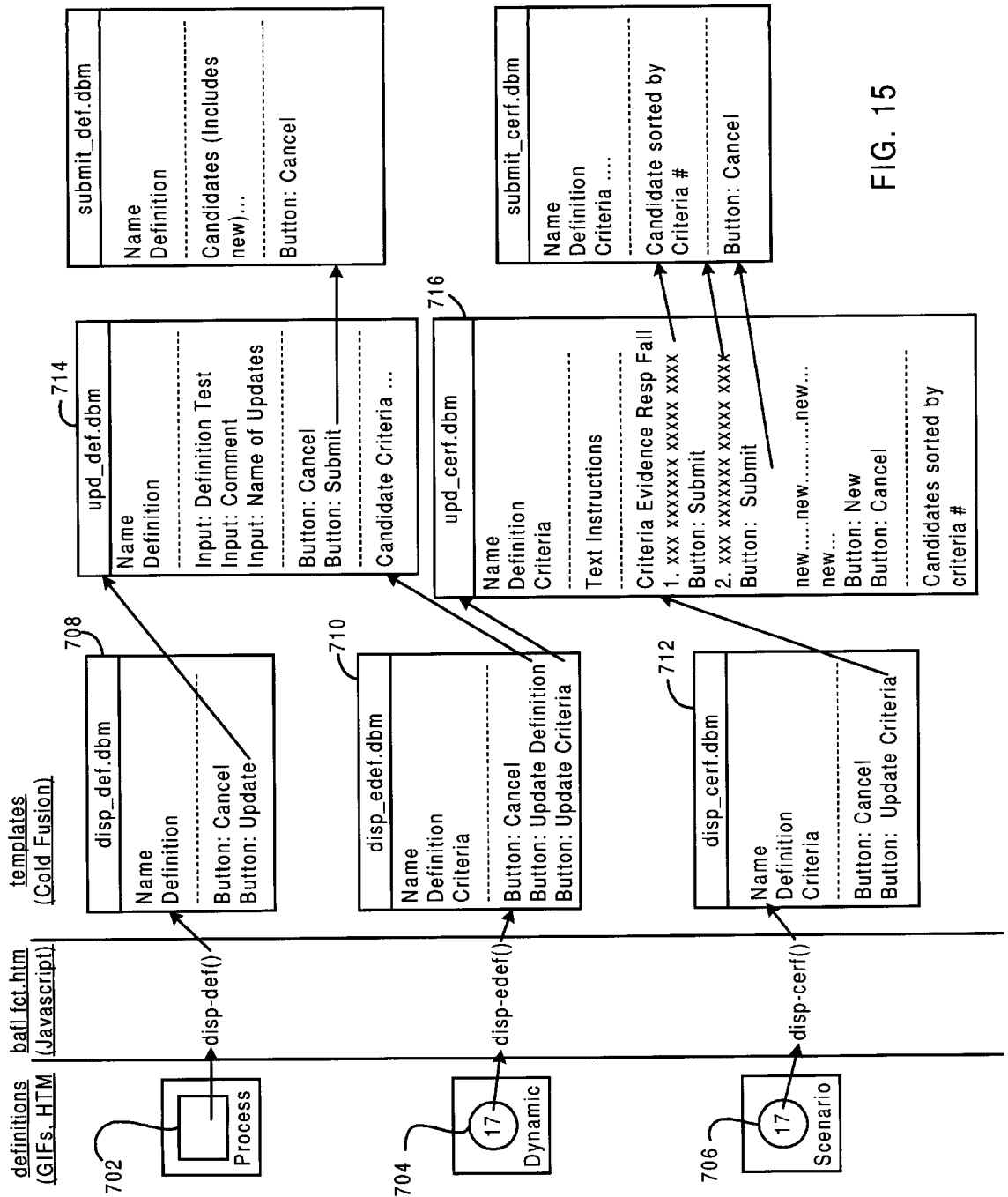
FIG. 15 shows example Javascript functions and Cold Fusion templates that are used in updating a definition, and in the creation/updating of a CERF entry.

FIG. 15 shows example Javascript functions and Cold Fusion templates that are used in updating a definition, and in the creation/updating of a CERF entry. The objects that are displayed and defined as, for example, GIF or HTML objects, are shown as a process block 702, a symbol 704 for and event within a dynamic view, and a symbol 706 of an event within a scenario view. The Javascript functions to which the object are mapped are shown in the second column, wherein the disp_def() function is mapped to the process object 702, the disp_edef() function is mapped to the symbol 704 in the dynamic view, and the function disp_cerf() is mapped to the symbol 706 in the scenario view. The disp_def() function references template 708; the disp_edef() function references template 710; and the disp_cerf() function references template 712. It can be seen that the various button attributes reference additional templates, for example 714 and 716.

Figure 16:
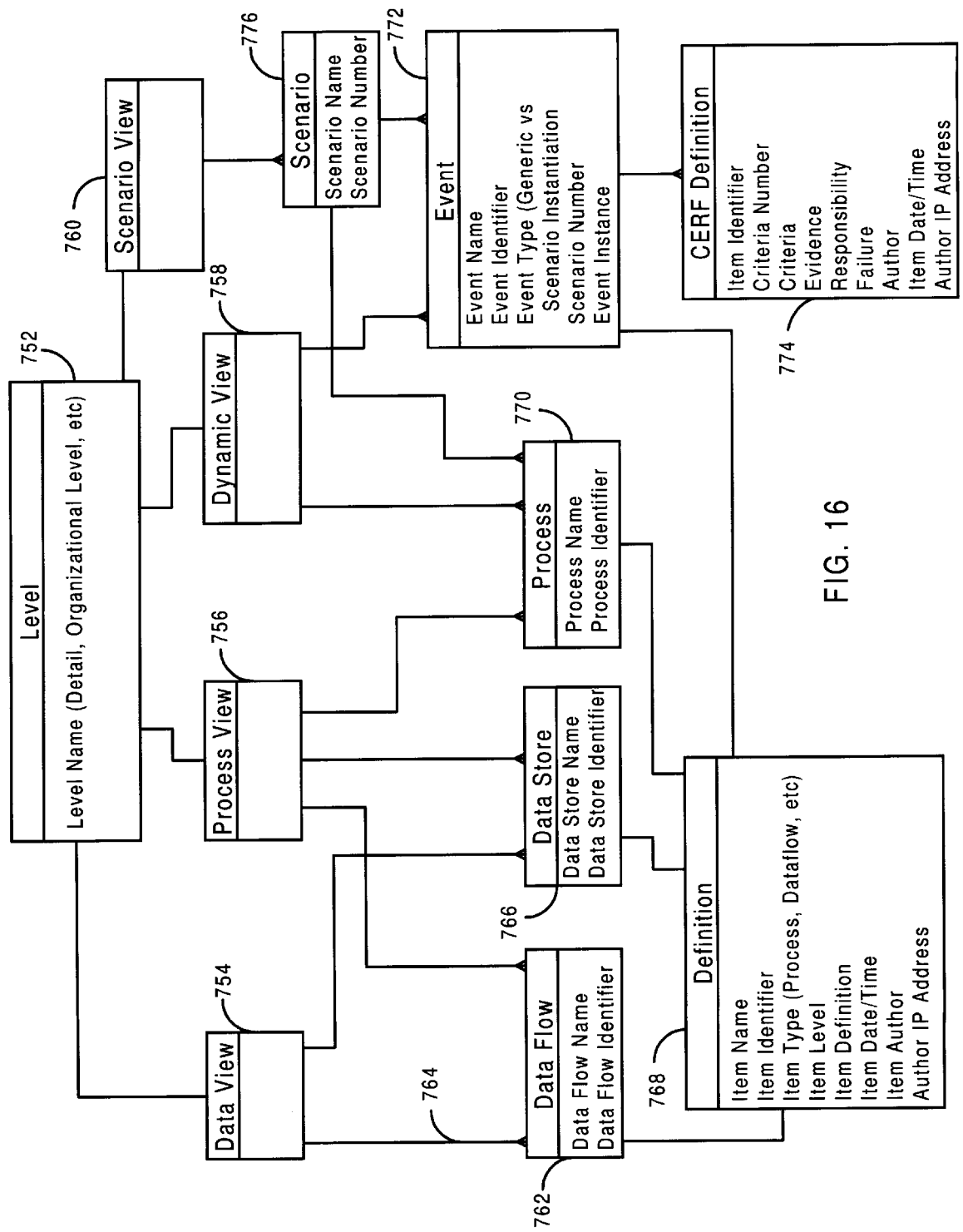
FIG. 16 is a block diagram that illustrates the hierarchical relationship between the data objects used to model an organization.

FIG. 16 is a block diagram that illustrates the hierarchical relationship between the data objects used to model an organization. At the top of the hierarchy is the level block 752 which has a level name attribute. Each level includes a data view block 754, a process view block 756, a dynamic view block 758, and a scenario view block 760.

A data view 754 is composed of one or more data flow blockby forked as represented by forked line 764, and one or more data store blocks 766. Each data flow 762 element includes a definition, as depicted by block 768, and each data store 766 element includes a definition. It will be appreciated that even though the data flow block 762 and data store block 766 are shown as connected to one definition block 768, each data flow and data store has its own individual definition.

A process view 756 is composed of one or more data flows 762, one or more data stores 766, and one or more processes 770. Each process has an associated definition 768. A dynamic view 758 is composed of one or more processes and one or more events 772. Each event 772 has an associated definition 768 and one or more CERF definitions 774. One or more scenarios 776 define a scenario view 760. Each scenario 776 includes one or more processes 770 and one or more events 772.

We claim:

1. A computer implemented method for modeling activities of people in an organization, comprising:

establishing definitions of processes performed by people of the organization;

establishing definitions of data elements generated from the processes by the organization;

establishing definitions of relationships between the data elements and the processes, wherein a relationship definition symbolizes a data element provided by a process and required by another process;

displaying the processes as nodes on a graph and the data elements as directed edges connecting nodes;

establishing definitions of events, wherein occurrence of an event results in initiation of a process and selected ones of the event definitions include criteria attributes characterizing criteria that must be met in order to transition from a first process to a second process and failure attributes defining a deviation path to follow if the criteria are not met, the deviation path including a group of associated events and processes at which the deviation path begins and ends;

establishing definitions of groups of events that are associated with paths between the processes, wherein a path includes a process at which the path begins, another process at which the path ends, and a set of one or more associated events; and displaying, responsive to an input selection signal, a selected one of the paths, wherein processes in the path are depicted using a predetermined shape, and events in the path are depicted as directional lines that interconnect the processes and have an order of presentation that indicates a chronological relationship between the events.

2. The method of claim 1, further comprising, displaying, responsive to an input selection signal, cardinal relationships between the data elements.

3. The method of claim 2, further comprising, displaying, responsive to an input selection signal, specific attributes of the data elements.

4. The method of claim 1, further comprising:

establishing definitions of symbols associated with the events; and displaying symbols near edges of the events with which the symbols are associated.

5. The method of claim 4, wherein each symbol is a circle with a number associated with an event.

6. The method of claim 4, wherein each symbol is a circle with a letter associated with an event.

7. The method of claim 4, wherein each symbol is a graphical icon associated with an event.

8. The method of claim 1, further comprising:

associating names with the events; and displaying names near edges of the events with which the names are associated.

9. The method of claim 1, further comprising:

displaying each process in the selected path as a generally vertical line; and displaying each event in the selected path as a generally horizontal directional line that connects two of the generally vertical lines.

10. The method of claim 9, further comprising:

establishing definitions of symbols associated with the events; and displaying symbols near edges of the events with which the symbols are associated.

11. The method of claim 10, wherein a symbol includes a number within a circle.

12. The method of claim 1, further comprising:

establishing definitions of symbols associated with the events;

displaying the symbols near the lines that represent the events with which the symbols are associated.

13. The method of claim 12, wherein a symbol includes a number within a circle.

14. The method of claim 12, wherein a symbol includes a letter within a circle.

15. The method of claim 12, wherein a symbol is a graphical icon.

16. The method of claim 12, further comprising:

establishing textual descriptions associated with the events;

displaying, responsive to an input selection signal, a textual description associated with an event.

17. The method of claim 16, further comprising, generating the input selection signal in response to selection of the symbol with a computer-based pointing device.

18. The method of claim 1, further comprising:

associating names with the events;

displaying the names near the lines that represent the events with which the names are associated.

19. The method of claim 1, further comprising:
establishing textual descriptions of criteria and responsibility attributes associated with selected ones of the events, wherein responsibility attributes identify an entity that is responsible for affirming that criteria for an event are met; and
displaying, responsive to an input selection signal, descriptions of criteria and responsibility attributes associated with an event.

20. The method of claim 19, further comprising:
establishing textual descriptions of evidence and failure attributes associated with selected ones of the events, wherein evidence attributes for an event characterize evidence that must exist in order to show that the criteria have been met; and
displaying, responsive to an input selection signal, descriptions of evidence and failure attributes associated with an event.

21. The method of claim 1, further comprising, displaying a deviation path, wherein processes in the deviation path are depicted using a predetermined shape, and events in the deviation path are depicted as directional lines that interconnect the processes and having an order of presentation that indicates a chronological ordering of the events.

22. The method of claim 1, further comprising:
wherein at least one of the process definitions includes definitions of sub-processes that comprise the process;
establishing definitions of data elements generated by the entities performing the sub-processes;
establishing definitions of relationships between selected data elements and the sub-processes, wherein a relationship definition symbolizes a data element provided by a first one of the sub-processes and required by a second one of the sub-processes; and
displaying, responsive to an input selection signal, sub-processes as nodes on a graph and associated data elements as directed edges connecting the nodes.

23. The method of claim 22, further comprising:
presenting the nodes of processes as selectable graphical object; and
displaying the sub-processes in response to selection via a computer pointing device of the graphical object representing the process.

24. The method of claim 22, further comprising:
establishing definitions of events, wherein occurrence of events results in initiation of processes and sub-processes;
establishing definitions of groups of events that are associated with paths between the processes and sub-processes, wherein a path includes a process or sub-process at which the path begins, another process or sub-process at which the path ends, and a set of one or more associated events; and
displaying, responsive to an input selection signal, a selected one of the paths, wherein processes and sub-processes in the path are depicted using a predetermined shape, and events in the path are depicted as directional lines that interconnect the processes and interconnect the sub-processes and have an order of presentation that indicates a chronological relationship between the events.

25. The method of claim 1, further comprising:
presenting the nodes of processes as selectable graphical object;
in response to selection of the graphical object representing the process via a computer pointing device, displaying a textual description associated with the process.

26. An apparatus for modeling activities of people in an organization, comprising:
means for establishing definitions of processes performed by people of the organization;
means for establishing definitions of data elements generated from the processes by the organization;
means for establishing definitions of relationships between the data elements generated and the processes, wherein a relationship definition symbolizes a data element provided by a first one of the processes and required by a second one of the processes; and
means for displaying processes as nodes on a graph and the data elements as directed edges connecting nodes;
means for establishing definitions of events, wherein occurrence of an event results in initiation of a process and selected ones of the event definitions include criteria attributes characterizing criteria that must be met in order to transition from a first process to a second process and failure attributes defining a deviation path to follow if the criteria are not met, the deviation path including a group of associated events and processes at which the deviation path begins and ends; and
means for establishing definitions of groups of events that are associated with paths between the processes, wherein a path includes a process at which the path begins, another process at which the path ends, and a set of one or more associated events; and
means for displaying, responsive to an input selection signal, a selected one of the paths, wherein processes in the path are depicted using a predetermined shape, and events in the path are depicted as directional lines that interconnect the processes and have an order of presentation that indicates a chronological relationship between the events.

27. A system for modeling activities of people in an organization, comprising:
a server system;
a database system coupled to the server system and including definitions of processes performed by people of the organization, definitions of data elements generated from the processes by the organization, definitions of relationships between the data elements generated and the processes, definitions of events, wherein occurrence of an event results in initiation of a process and selected ones of the event definitions include criteria attributes characterizing criteria that must be met in order to transition from a first process to a second process and failure attributes defining a deviation path to follow if the criteria are not met, the deviation path including a group of associated events and processes at which the deviation path begins and ends, and definitions of groups of events that are associated with paths between the processes, wherein a path includes a process at which the path begins, another process at which the path ends, and a set of one or more associated events, wherein a relationship definition symbolizes a data element provided by a first one of the processes and required by a second one of the processes, and occurrence of an event results in initiation of a process;
a client system coupled to the server system and configured and arranged, responsive to an input control signal, to request from the server system referenced data and display processes as nodes on a graph and the data elements as directed edges connecting nodes, and displaying, responsive to an input selection signal, a selected one of the paths, wherein processes in the path are depicted using a predetermined shape, and events in the path are depicted as directional lines that interconnect the processes and have an order of presentation that indicates a chronological relationship between the events.

* * * * *